(12) United States Patent  (10) Patent No.: US 7,336,648 B1
Sasagawa  (45) Date of Patent: Feb. 26, 2008

(54) LABEL SWITCHING SYSTEM

(75) Inventor: Yasushi Sasagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 724 days.

(21) Appl. No.: 09/696,674

(22) Filed: Oct. 25, 2000

(30) Foreign Application Priority Data

Jan. 11, 2000 (JP) ............................. 2000-006160

(51) Int. Cl.
H04L 12/28 (2006.01)
H04L 1/00 (2006.01)
H04L 12/26 (2006.01)
H04L 12/56 (2006.01)

(52) U.S. Cl. ...................... 370/351; 370/230; 370/389; 370/395.52; 370/401

(58) Field of Classification Search ................ 370/392, 370/395.1, 395.52, 395.53, 401, 466, 474, 370/475, 428
See application file for complete search history.

(56) References Cited

U.S. PATENT DOCUMENTS

| 5,455,825 | A | | 10/1995 | Lauer et al. | |
|---|---|---|---|---|---|
| 5,699,347 | A | * | 12/1997 | Callon | ........................ 370/238 |
| 5,854,899 | A | * | 12/1998 | Callon et al. | ................ 709/238 |
| 6,408,001 | B1 | * | 6/2002 | Chuah et al. | ................ 370/392 |
| 6,530,032 | B1 | * | 3/2003 | Shew et al. | ..................... 714/4 |
| 6,594,704 | B1 | * | 7/2003 | Birenback et al. | ........... 709/238 |
| 6,628,649 | B1 | * | 9/2003 | Raj et al. | ..................... 370/360 |
| 6,674,744 | B1 | * | 1/2004 | Doshi et al. | ................. 370/352 |
| 6,680,943 | B1 | * | 1/2004 | Gibson et al. | ............... 370/392 |
| 6,721,269 | B2 | * | 4/2004 | Cao et al. | .................... 370/227 |
| 6,735,190 | B1 | * | 5/2004 | Chuah et al. | ................ 370/352 |

FOREIGN PATENT DOCUMENTS

JP 856230 2/1996

OTHER PUBLICATIONS

Notice of Reasons for Rejection dated Sep. 6, 2005 with translation.
Hyeong Ho Lee, et al. Structures of an ATM Switching System with MPLS Functionality. IEEE Globecom 1999, vol. 1B, pp. 616-620.
Bilel Jamoussi. Constraint-Based LSP Setup using LDP. Internet-Draft, Sep. 1999, draft-ietf-mpls-cr-ldp-03.txt.
Dave Katz. Traffic Engineering Extensions to OSPF. Oct. 1999, draft-katz-yeung-ospf-traffic-01.txt.
D.O. Awduche et al. Extensions to RSVP for LSP Tunnels. Sep. 1999, draft-ieft-mpls-rsvp-lsp-tunnel-04.txt.

* cited by examiner

Primary Examiner—Edan Orgad
Assistant Examiner—Blanche Wong
(74) Attorney, Agent, or Firm—Katten Muchin Rosenman LLP

(57) ABSTRACT

A packet router in a label switching system includes a logical router configuring module for logically dividing a label switching router (LSR) into a plurality of LSRs each having a label switching function, and a module for specifying, when setting a label switched path on the basis of an explicit route specified, a port or a port group of an egress node. With this construction, a label switching architecture in an ATM network for actualizing MPLS (label switching) can be mapped to an ATM-Switch base system architecture, and a granularity or function (Constraint Base Routing) of specifying a variety of routes provided by MPLS can be attained.

12 Claims, 25 Drawing Sheets

FIG.13

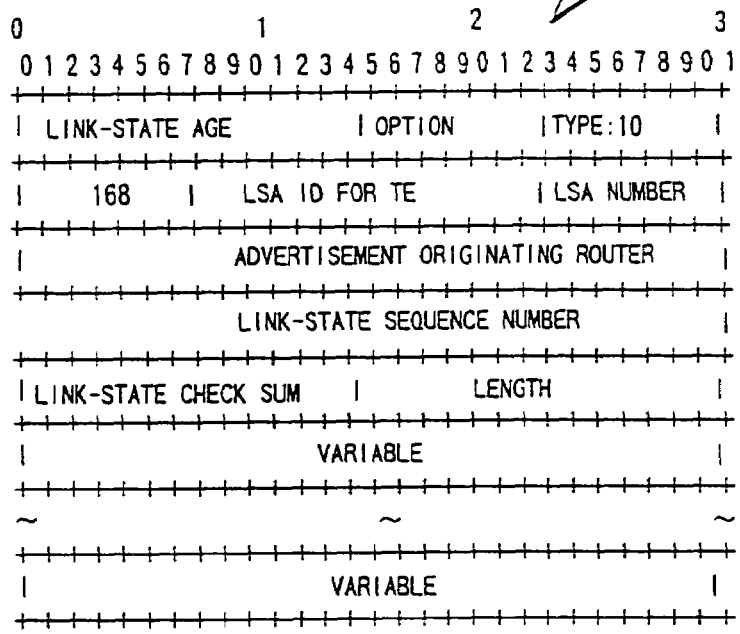

EXAMPLE OF DEFINITION OF OPAQUE LSA OF OSPF FOR TRAFFIC ENGINEERING

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   LINK-STATE AGE              |  OPTION       |  TYPE:10      |
+-+-+-+-+-+-+-+-+-+-+-+-+-+-+-+-+-+-+-+-+-+-+-+-+-+-+-+-+-+-+-+-+
|      168      |    LSA ID FOR TE              |  LSA NUMBER   |
+-+-+-+-+-+-+-+-+-+-+-+-+-+-+-+-+-+-+-+-+-+-+-+-+-+-+-+-+-+-+-+-+
|              ADVERTISEMENT ORIGINATING ROUTER                 |
+-+-+-+-+-+-+-+-+-+-+-+-+-+-+-+-+-+-+-+-+-+-+-+-+-+-+-+-+-+-+-+-+
|                   LINK-STATE SEQUENCE NUMBER                  |
+-+-+-+-+-+-+-+-+-+-+-+-+-+-+-+-+-+-+-+-+-+-+-+-+-+-+-+-+-+-+-+-+
|   LINK-STATE CHECK SUM        |            LENGTH             |
+-+-+-+-+-+-+-+-+-+-+-+-+-+-+-+-+-+-+-+-+-+-+-+-+-+-+-+-+-+-+-+-+
|                           VARIABLE                            |
+-+-+-+-+-+-+-+-+-+-+-+-+-+-+-+-+-+-+-+-+-+-+-+-+-+-+-+-+-+-+-+-+
~                              ~                                ~
+-+-+-+-+-+-+-+-+-+-+-+-+-+-+-+-+-+-+-+-+-+-+-+-+-+-+-+-+-+-+-+-+
|                           VARIABLE                            |
+-+-+-+-+-+-+-+-+-+-+-+-+-+-+-+-+-+-+-+-+-+-+-+-+-+-+-+-+-+-+-+-+
```

1: ROUTER ADDRESS TVLV (TYPE-VARIABLE LENGTH-VALUE)
   4-OCTET IP ADDRESS OF ROUTER FOR GENERATING LSA

2: NEIGHBOR TVLV
   DESCRIBE ADJACENT SERIES IN TRAFFIC ENGINEERING TOPOLOGY
   LINK TYPE, LINK ID, METRIC, SUB-TVLVs AND SUB-TVLVs OF SIZE 0 OR
   LARGER INCLUSIVE. SUB-TVLVs ARE USED FOR SUPPLYING ADDED DATA

LINK TYPE              1 OCTETS, 1:P2P, 2:MULTI-ACCESS
   LINK ID                4 OCTETS
   METRIC                 4 OCTETS
   LENGTH OF SUB-TVLV     2 OCTETS
   SUB-TVLVs OF 0-65504 OCTETS, FOLLOWING SUB-TVLVs ARE DEFINED

SUB-TVLV TYPE, LRNGTH (OCTET), VALUE (OCTET), NAME
   1             1              4    INTERFACE ADDRESS
   2             1              4    ADJACENT ADDRESS
   3             1              4    MAXIMUM LINK BAND
   4             1              2    MAXIMUM POSSIBLE-OF-ALLOCATION LIUNK BAND(%)
   5             1             32    PRESENT RESERVE BAND
   6             1              4    RESOURCE CLASS
                                     (COLOR, MANAGEMENT GROUP)

* THIS IS 4-OCTET BIT MASK ALLOCATED BY NETWORK MANAGER AND EACH BIT
  CORRESPONDS TO ONE MANAGEMENT GROUP ALLOCATED TO INTERFACE

FIG. 14
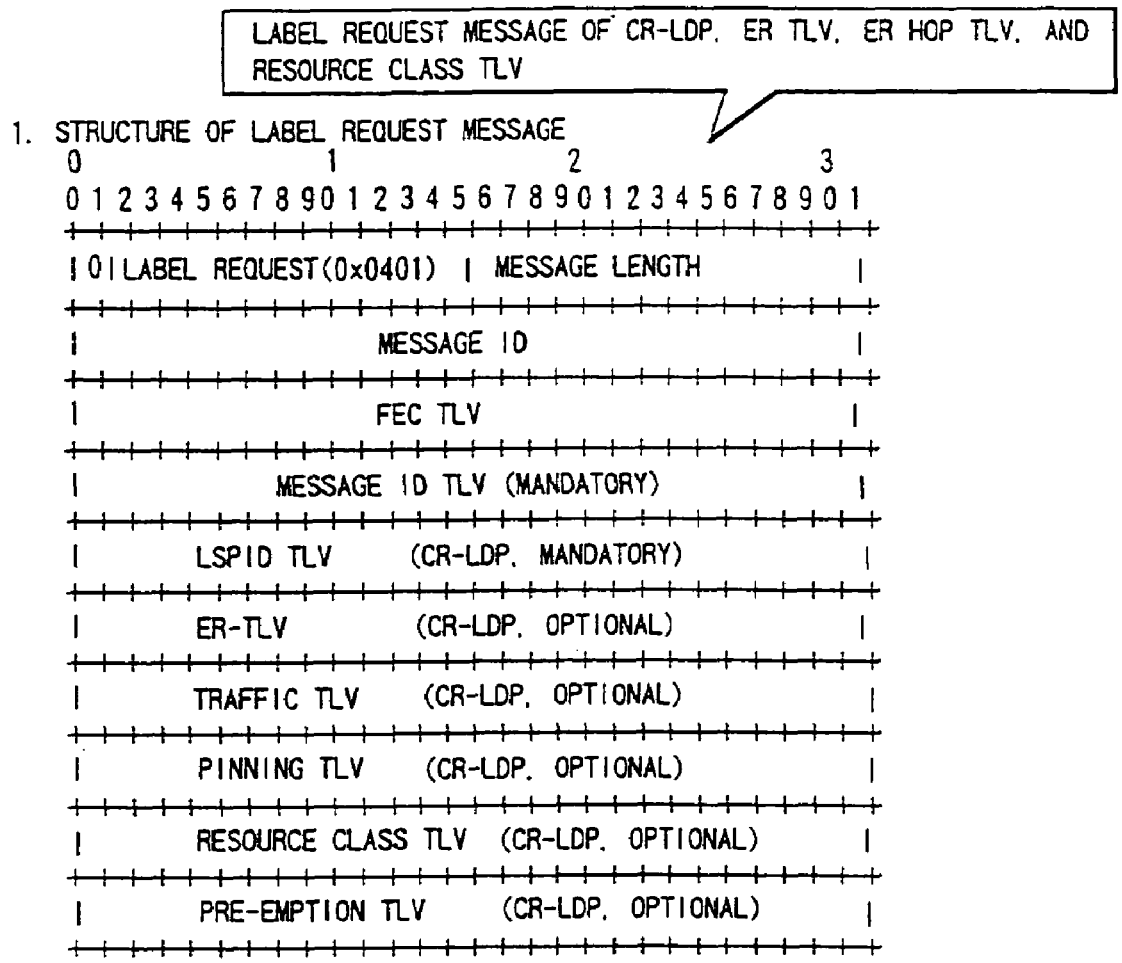
1. STRUCTURE OF LABEL REQUEST MESSAGE
LABEL REQUEST MESSAGE OF CR-LDP, ER TLV, ER HOP TLV, AND RESOURCE CLASS TLV
2. STRUCTURE OF EXPLICIT ROUTE TLV (ER-TLV)
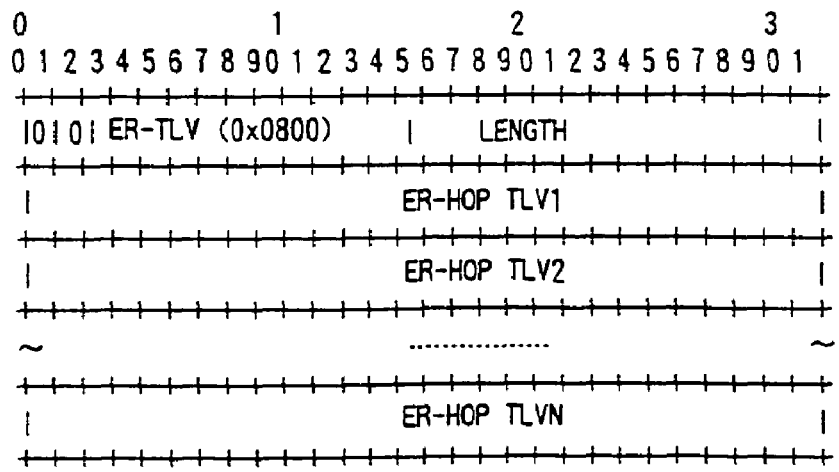

FIG.15

> LABEL REQUEST MESSAGE OF CR-LDP, ER TLV, ER HOP TLV, AND RESOURCE CLASS TLV

3. STRUCTURE OF EXPLICIT ROUTE HOP TLV(ER-HOP TLV)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0| ER-HOP TYPE          |           LENGTH                   |
+-+-+-+-+-+-+-+-+-+-+-+-+-+-+-+-+-+-+-+-+-+-+-+-+-+-+-+-+-+-+-+-+
|L|                CONTENT//                                    |
+-+-+-+-+-+-+-+-+-+-+-+-+-+-+-+-+-+-+-+-+-+-+-+-+-+-+-+-+-+-+-+-+
```

ER-HOP TYPE

| VALUE | TYPE |
|---|---|
| 0x801 | IPv4 PREFIX |
| 0x802 | IPv6 PREFIX |
| 0x803 | SELF-SUPPORTED SYSTEM NUMBER |
| 0x804 | LSPID |

4. STRUCTURE OF IPv4 PREFIX

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0|       0x801          |           LENGTH                   |
+-+-+-+-+-+-+-+-+-+-+-+-+-+-+-+-+-+-+-+-+-+-+-+-+-+-+-+-+-+-+-+-+
|L|  RESERVE               |      PREFIX LENGTH                 |
+-+-+-+-+-+-+-+-+-+-+-+-+-+-+-+-+-+-+-+-+-+-+-+-+-+-+-+-+-+-+-+-+
|              IPv4 ADDRESS(4 OCTETS)                            |
+-+-+-+-+-+-+-+-+-+-+-+-+-+-+-+-+-+-+-+-+-+-+-+-+-+-+-+-+-+-+-+-+
```

5. STRUCTURE OF RESOURCE CLASS(COLOR) TLV

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0| RESCLS-TLV (0x0822)  |           LENGTH                   |
+-+-+-+-+-+-+-+-+-+-+-+-+-+-+-+-+-+-+-+-+-+-+-+-+-+-+-+-+-+-+-+-+
|                  RESOURCE CLASS                                |
+-+-+-+-+-+-+-+-+-+-+-+-+-+-+-+-+-+-+-+-+-+-+-+-+-+-+-+-+-+-+-+-+
```

FIG.16

EXAMPLE OF ADDITIONAL DEFINITION OF ER HOP TLV

1. EXAMPLE OF STRUCTURE OF EXPLICIT ROUTE HOP TLV (ER-HOP TLV)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0| ER-HOP TYPE       |           LENGTH              |
+-+-+-+-+-+-+-+-+-+-+-+-+-+-+-+-+-+-+-+-+-+-+-+-+-+-+-+-+-+-+-+-+
|L|                     CONTENT//                       |
+-+-+-+-+-+-+-+-+-+-+-+-+-+-+-+-+-+-+-+-+-+-+-+-+-+-+-+-+-+-+-+-+
```

ER-HOP TYPE

| VALUE | TYPE |
|---|---|
| 0x801 | IPv4 PREFIX |
| 0x802 | IPv6 PREFIX |
| 0x803 | SELF-SUPPORTED SYSTEM NUMBER |
| 0x804 | LSPID |
| 0x805 | PORT AND PORT GROUP (LINK AND LINK GROUP) ← EXAMPLE OF ADDITION |
| 0x806 | RESOURCE CLASS ← EXAMPLE OF ADDITION |

2. EXAMPLE OF STRUCTURE OF PORT AND PORT GROUP (LINK AND LINK GROUP) ← EXAMPL OF ADDITION

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0|     0x801         |           LENGTH              |
+-+-+-+-+-+-+-+-+-+-+-+-+-+-+-+-+-+-+-+-+-+-+-+-+-+-+-+-+-+-+-+-+
| OUTPUT PORT GROUP NUMBER |    OUTPUT PORT NUMBER      |
+-+-+-+-+-+-+-+-+-+-+-+-+-+-+-+-+-+-+-+-+-+-+-+-+-+-+-+-+-+-+-+-+
```

OUTPUT PORT GROUP NUMBER : THIS NUMBER INDICATES PORT GROUP (LINK GROUP OR INTERFACE GROUP) IN DOWNSTREAM DIRECTION OF LSP PASSING THROUGH SYSTEM
ALL'1' INDICATES WILD CARD. THIS CARD IS USED FOR SPECIFYING ONLY OUTPUT PORT

OUTPUT PORT NUMBER : THIS NUMBER INDICATES PORT (LINK OR INTERFACE) IN DOWNSTREAM DIRECITON OF LSP PASSING THROUGH SYSTEM
ALL'1' INDICATES WILD CARD. THIS IS USED FOR SPECIFYING ONLY OUTPUT PORT GROUP

FIG.17

PATH MESSAGE OF RSVP EXTENSION, EXPLICIT_ROUTE OBJECT AND IPv4 SUBOBJECT

1. STRUCTURE OF PATH MESSAGE

```
<PATH MESSAGE>::=     <COMMON HEADER>[<INTEGRITY>]
                      <SESSION><RSVP_HOP>
                      <TIME_VALUES>
                      [<EXPLICIT_ROUTE>]
                      <LABEL_REQUEST>
                      [<SESSION_ATTRIBUTE>]
                      [<POLICY_DATA>...]
                      [<SENDER DESCRIPTOR>]

<SENDER DESCRIPTOR>::= <SENDER_TEMPLATE>[<SENDER_TSPEC>]
                       [<ADSPEC>]
                       [<RECORD_ROUTE>]
```

2. STRUCTURE OF EXPLICIT ROUTE OBJECT

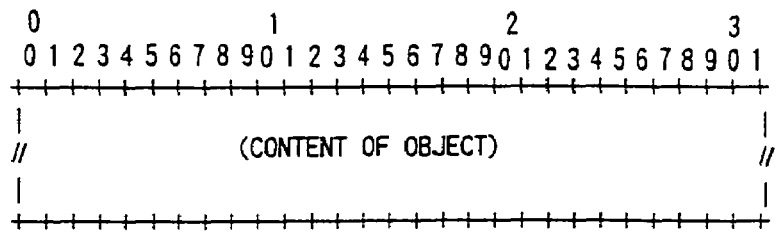

EXPLICIT ROUTE OBJECT IS A SERIES OF VARIABLE LENGTH DATA ITEMS CALLED SUBOBJECTS

3. SUBOBJECTS

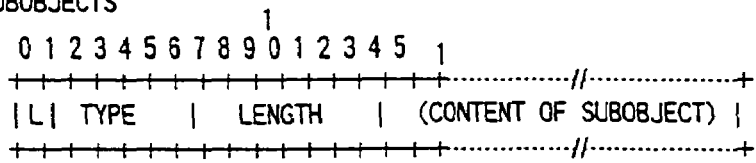

TYPE: THIS INDICATES TYPE OF CONTENT OF SUBOBJECT. VALUES DEFINED AT PRESENT ARE AS FOLLOWS

0    RESERVE
    1    IPv4 PREFIX
    2    IPv6 PREFIX
    32   SELF-SUPPORTED SYSTEM NUMBER
    64   TERMINATING OF MPLS LABEL SWITCHED PATH

4. IPv4 PREFIX

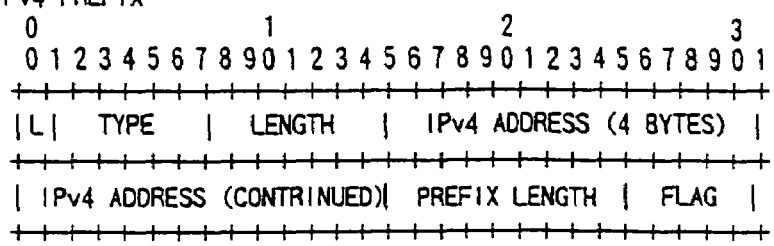

FIG.18

EXAMPLE OF ADDITIONAL DEFINITION OF SUBOBJECT OF EXPLICIT_ROUTE OBJECT

1. SUBOBJECTS

```
 0                   1
+-+-+-+-+-+-+-+-+-+-+-+-+-+-+-+-+-............//...........+
|L|  TYPE    |    LENGTH     | (CONTENT OF SUBOBJECT)      |
+-+-+-+-+-+-+-+-+-+-+-+-+-+-+-+-+-............//...........+
```

TYPE: THIS INDICATES TYPE OF CONTENT OF SUBOBJECT. VALUES DEFINED AT PRESENT ARE AS FOLLOWS
        0    RESERVE
        1    IPv4 PREFIX
        2    IPv6 PREFIX
       32    SELF-SUPPORTED SYSTEM NUMBER
       64    TERMINATING OF MPLS LABEL SWITCHED PATH
      127   PORT AND PORT GROUP (LINK AND LINK GROUP)   ←ADDITION

2. EXAMPLE OF CONFIGURATION OF PORT AND PORT GROUP (LINK AND LINK GROUP) ←ADDITION

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    TYPE     |    LENGTH     |   OUTPUT PORT GROUP NUMBER      |
+-+-+-+-+-+-+-+-+-+-+-+-+-+-+-+-+-+-+-+-+-+-+-+-+-+-+-+-+-+-+-+-+
|     OUTPUT PORT NUMBER      |            FLAG                 |
+-+-+-+-+-+-+-+-+-+-+-+-+-+-+-+-+-+-+-+-+-+-+-+-+-+-+-+-+-+-+-+-+
```

OUTPUT PORT GROUP NUMBER : THIS NUMBER INDICATES PORT GROUP (LINK GROUP OR INTERFACE GROUP) IN DOWNSTREAM DIRECTION OF LSP PASSING THROUGH SYSTEM
ALL '1' INDICATES WILD CARD. THIS IS USED FOR SPECIFYING ONLY OUTPUT PORT

OUTPUT PORT NUMBER : THIS NUMBER INDICATES PORT (LINK OR INTERFACE) IN DOWNSTREAM DIRECITON OF LSP PASSING THROUGH SYSTEM
ALL '1' INDICATES WILD CARD. THIS IS USED FOR SPECIFYING ONLY OUTPUT PORT GROUP

LABEL SWITCHING SYSTEM

BACKGROUND OF THE INVENTION

The present invention relates generally to a label switching system, and more particularly to an explicit routing method and a packet router in this label switching system.

The label switching is a key technology for actualizing an Intranet/Internet backbone oriented high-speed transfer, traffic load sharing and band control on a full scale. The label switching also functions to match a routing process at an IP level (Layer 3) with a switching process on a lower layer (Layer 2) where ATM, a frame relay, Ethernet etc are conducted, and perform packet forwarding (transmission, exchange and transfer) on Layer 2 according to [labels] attached to IP packets.

Standardization of this label switching are now being promoted as MPLS (Multi Protocol Label Switching) by MPLS-WG of IETF (Internet Engineering Task Force). Further, ITU (International Telecommunication Union) also examines the use of MPLS in IP over ATM (IP/ATM) in the public network.

Generally, the label switching has such a characteristic that the data can be transferred at a high speed, a scalability can be obtained, and a traffic can be easily controlled. An ATM-LSR (ATM Label Switching Router) for actualizing the label switching in the ATM network uses VPI (Virtual Path Identifier) for identifying VP (Virtual Path) and VCI (Virtual Channel Identifier) for identifying VC (Virtual Channel) as labels, and IP packets are mapped (interworking) to ATM layer (Layer 2).

Taking into consideration a situation wherein a great number of ATM networks have already been developed in the field and a multiplicity of ATM systems have been put on the market, for developing the label switching in a real network, it is of much importance to contrive how the existing ATM-Switch architecture is mapped to the label switching. It is also desired that the label switching exhibiting a high compatibility with the existing ATM-Switch architecture, be actualized.

On the other hand, traffic engineering (load sharing) conceived as one of most important applications of MPLS aims at utilizing an efficient and reliable network and at the same time optimizing an activity ratio of network resources. What is requested for attaining this is a (Constraint Base Routing) function of specifying a variety of routes without being limited to the IP routing with respect to MPLS.

Moreover, it is desired for actualizing optimization of the traffic engineering that the traffic engineering be capable of gasping an activity state of the network resources with a variety of hyper structures. Accordingly, the variety of granularity are likewise required of the (CR) function of specifying the many routes provided by MPLS.

It is herein considered to design an architecture for actualizing an LSR (Label Switching Router) as an edge device of MPLS on ATM-Switch base. What is herein focused on is a method of mounting an IP/MPLS forwarding function.

FIGS. 1, 2 and 3 each show an example of architecture of the LSR as the MPLS edge device on ATM-Switch base, wherein the label switching architecture is mapped intact.

The example of architecture shown in FIG. 1 includes a method of incorporating the IP/MPLS forwarding function into a CPU. According to this method, however, the CPU analyzes the packets, searches a routing table and edits a packet header, and therefore high-speed forwarding can not be actualized.

What is given in the example of architecture shown in FIG. 2 is such a method that the IP/MPLS forwarding function (hardware) is mounted at a pre-stage of the CPU, the CPU controls the IP/MPLS forwarding function on the basis of data about results of executing a label distribution protocol and a routing protocol, the IP/MPLS forwarding function resultantly short-cuts the CPU, and the high-speed forwarding is thus actualized.

According to this method, when actualized based on the ATM switch, a common unit needs a new piece of hardware, and there is a problem in terms of a mounting space and a mounting cost as well.

What is given in the example of architecture shown in FIG. 3 is such a method that the IP/MPLS forwarding function (hardware) is mounted in each adapter (an external interface: a package containing one or a plurality of ports, which corresponds to a port group), the CPU controls the IP/MPLS forwarding function on the basis of the data about the results of executing the label distribution protocol and the routing protocol, the IP/MPLS forwarding function resultantly short-cuts the CPU, and the high-speed forwarding is thus actualized.

This method needs an addition of functions to the adapter (the problems in terms of mounting is smaller than a change in the common unit), and, as in the example of architecture shown in FIG. 2, there exists the problem in terms of the mounting space and the mounting cost. Further, both of the adapter at an ingress for the packets and the adapter at an egress for the packets terminate the IP/MPLS, which is redundant control.

An example of architecture shown in FIG. 4 may be considered as an eclectic design of architecture between FIG. 2 and FIG. 3. This is a method, wherein the IP/MPLS forwarding function (hardware) is mounted in an egress for the packets, i.e., in the adapter provided toward a non-MPLS network, the CPU controls the IP/MPLS forwarding function on the basis of the data about the results of executing the label distribution protocol and the routing protocol, the IP/MPLS forwarding function resultantly short-cuts the CPU, and the high-speed forwarding is thus actualized.

This method needs an addition of functions to the adapter (the problems in terms of mounting is smaller than the change in the common unit), and, as in the examples of architecture shown in FIGS. 2 and 3, there exists the problem in terms of the mounting space and the mounting cost. On the system, however, IP/MPLS is terminated by only the adapter at the egress for the packets, and hence the redundant control is not required, which is more advantageous than the example of architecture shown in FIG. 3.

Herein, the label distribution protocol of MPLS will be described. The label distribution protocol is roughly categorized into the following two types as routing methods.

(1) Hop by hop routing: A route is determined (routing) hop by hop based on a routing table.

(2) Constraint Base Routing: This is explicit routing by an ingress node on the basis of routing data and other various items of data, and is also routing in which a variety of system resources such as QoS etc are specified.

Further, the following three protocols are the typical label distribution protocols.

(1) LDP (Label Distribution Protocol: Note that this herein indicates a specific protocol.)

This is a protocol for best-effort communications by hop by hop routing.

(2) CR-LDP (Constraint-Based LSP Setup using LDP)

This is the label distribution protocol capable of performing the explicit routing and QoS communications etc, and is an extension version of LDP.

(3) RSVP Extensions (Extensions to RSVP for LSP Tunnels)

This is the label distribution protocol capable of performing the explicit routing and QoS communications etc, and is an extension version of RSVP.

It is to be noted that OSPF (Open Shortest Path First) is a routing protocol in FIGS. 1 through 4, and is one type of interior gateway protocol (IGP). Further, a forwarder, which terminates MPLS and IP, actualizes MPLS forwarding for the MPLS network and actualizes IP forwarding for the IP network (non-MPLS network).

FIG. 5 shows an example of sequence of the hop by hop routing. As shown in FIG. 5, according to the hop by hop routing, an ingress LSR (an Edge-LSR in an MPLS domain) that detects a trigger for setting an LSP (Label Switched Path) sets, in Label Request message, an FEC (Forwarding Equivalence Class: This indicates an aggregation of packets passing though the LSP, and, at the present, an address prefix having a length of 0~32 bits and a full host address are defined as FEC elements, and the FEC is an aggregation of the FEC elements.) corresponding to the LSP to be set. The ingress LSR then determines NEXT HOP by searching the routing table with the FEC serving as key data, and transmits Label Request message to this NEXT HOP.

A relay node (an ATM-LSR in an MPLS domain) receiving Label

Request message determines NEXT HOP by searching the routing table with the FEC in the received message serving as key data, and transmits Label Request message to this NEXT HOP.

An egress LSR (an Edge-LSR in an MPLS domain) receiving Label Request message recognizes that the egress LSR is the egress by searching the routing table with FEC in the received message serving as key data, then determines a label used for the LSP, subsequently sets the LSP and also sets the label in Label Mapping message, and transmits it to an upstream LSR.

The relay LSR receiving Label Mapping message sets an LSP to a downstream LSR, determines a label with respect to the upstream LSR which is used for this LSP, then sets the LSP and also sets this label in Label Mapping message, and transmits it to the upstream LSR.

The ingress LSR receiving Label Mapping message sets an LSP to the downstream LSR. The setting of the LSP from the ingress LSR down to the egress LSR is thus completed.

FIG. 6 shows an example of sequence of explicit routing based on CR-LDP. The followings are larger differences of this example from FIG. 5. The ingress LSR detecting the trigger for setting the LSP (Label Switched Path) determines a plurality of LSRs through which the LSP set by a local policy and so forth based on topology data etc passes, then explicitly sets the LSRs in Label Request message (the FEC set at this time is generally "CRLSP" additionally defined by CR-LSP, and it is indicated that the FEC corresponding to this LSP dynamically changes). The ingress LSR similarly determines NEXT HOP by the local policy etc, transmits Label Request message to this NEXT HOP. The relay LSR receiving Label Request message determines NEXT HOP on the basis of the explicit route in the received message, and the egress LSR receiving Label Request message recognizes from the explicit route in the received message that the same LSR itself is an egress.

FIG. 7 shows an example of sequence of explicit routing based on RSVP Extensions. The followings are large differences of this example from FIG. 6. LDP explicitly sets a session on TCP, while RSVP Extensions tacitly set the session. Label Request message and Label Mapping message are replaced respectively with Path message and Reserve message.

In the LSR adopting the system architecture shown in FIG. 4, if considering the LSP based on the label distribution protocol, the MPLS architecture can not be mapped well to the system architecture shown in FIG. 4 for reasons which follow.

(1) According to a concept of MPLS that is being now developed in IETF, the egress node terminates MPLS, then determines an output port in accordance with IP routing (forwarding), and forwards the packets.

(2) According to Explicit Routing (based on both of CR-LDP and RSVP Extensions) of MPLS that is nor being developed in IETF, a node or an aggregation of nodes through which the packets pass, is or are specified.

(3) In the system architecture shown in FIG. 4, an IP forwarding engine is mounted in the adapter, and hence it is required that not the egress node but the adapter of the egress node terminates IP/MPLS.

To be specific, the label distribution protocols of both of hop by hop routing and Explicit Routing are incapable of indicating an intra-system specified adapter or port, and it is therefore unfeasible to set the LSP in which the specified adapter of the egress node is a terminal.

In the case of hop by hop routing based on LDP, FEC is specified in Label Request message, and, according to a present version of LDP, only one FEC element is allowed as FEC in the message. Therefore, the egress node is capable of specifying the egress node from this FEC.

Further, as described above, a minimum unit of a hyper structure for specifying the explicit route of present MPLS, is a node. It might be herein considered that the hyper structure capable of specifying a given port and a given group of the node in addition to the specifying on the node basis.

SUMMARY OF THE INVENTION

Accordingly, it is a primary object of the present invention to provide an explicit routing method and a packet router that are capable of mapping a label switching architecture in an ATM network which actualizes MPLS (Label Switching) to an ATM-Switch base system architecture, and attaining a granularity of function (Constraint Base Routing) of specifying a variety of routes provided by MPLS.

Namely, the present invention aims at providing a design of how the MPLS architecture is mapped to the packet router (LSR) taking an architecture shown in FIG. 4, and of how this packet router is mapped to the MPLS architecture in terms of a mounting space and a mounting cost. To describe it in greater details, the present invention aims at designing how an egress adapter terminates MPLS in the packet router if this packet router is an egress of MPLS.

It is another object of the present invention to support a granularity capable of specifying a given port and a given port group in addition to the specifying on a node basis when specifying an explicit route of MPLS.

To accomplish the above objects, a first explicit routing method in a label switching system according to the present invention, comprises a step of logically dividing a label switching router (LSR) into a plurality of LSRs each having a label switching function, and a step of specifying, when setting a label switched path on the basis of an explicit route specified, a port or a port group of an egress node.

A second explicit routing method in a label switching system according to the present invention comprises a step of flooding, as topology data, a set of an intra-system port and an IP address allocated to the port, or a set of a port group among a plurality of groups into which the ports are divided, and an IP address allocated to the port group, and a step of managing the topology data flooded from other system and, when setting a label switched path on the basis of an explicit route specified, explicitly specifying a port or a port group of an egress node, and a port or a port group of a relay node on the basis of the received topology data.

A third explicit routing method in a label switching system according to the present invention comprises a step of flooding, as topology data, a set of an intra-system port and an IP address allocated to the port, or a set of a port group among a plurality of groups into which the ports are divided, and an IP address allocated to the port group.

A fourth explicit routing method in a label switching system according to the present invention comprises a step of flooding, as topology data, a set of an intra-system port and an IP address allocated to the port, or a set of a port group among a plurality of groups into which the ports are divided, and an IP address allocated to the port group by use of Opaque LSA of OSPF protocol.

A fifth explicit routing method in a label switching system according to the present invention comprises a step of explicitly specifying, when setting a label switched path on the basis of an explicit route specified, a port or a port group of an egress node, and a port or a port group of a relay node.

A sixth explicit routing method in a label switching system according to the present invention may further comprise a step of specifying a port or a port group of the egress node by setting an IP address corresponding to the port or the port group of the egress node in final ER-HOP-TLV in ER-TLVs in Label Request Message of CR-LDP, and a step of specifying a port or a port group of the relay node by setting an IP address corresponding to the port or the port group of the relay node in intermediate ER-HOP-TLV in ER-TLVs in Label Request Message of the CR-LDP.

A seventh explicit routing method in a label switching system according to the present invention may further comprise a step of specifying the port or the port group of the egress node and the port or the port group of the relay node by adding an intra-system port number or an intra-system port group number in ER-HOP-TLV in ER-TLVs in Label Request Message of CR-LDP.

An eighth explicit routing method in a label switching system according to the present invention may further comprise a step of explicating a port through which data should pass per system and specifying a port or a port group of the egress node by use of resource class TLV with ER-TLV in Label Request Message of CR-LDP being used as ER-HOP-TLV.

A ninth explicit routing method in a label switching system according to the present invention may further comprise a step of specifying a port or a port group of the egress node by setting an IP address corresponding to the port or the port group of the egress node in final Subject-object in Explicit Route Objects in a path message of RSVP protocol extended for setting a label switched path in MPLS protocol, and a step of specifying a port or port group of the relay node by setting an IP address corresponding to the port or the port group of the relay node in intermediate Subject-object in Explicit Route Objects in the path message of the RSVP protocol.

A tenth explicit routing method in a label switching system according to the present invention may further comprise a step of specifying a port or a port group of the egress node and a port or a port group of the relay node by adding an intra-system port number or an intra-system port group number in Subject-object in Explicit Route Objects in the path message of RSVP protocol extended for setting the label switched path in MPLS protocol.

An eleventh explicit routing method in a label switching system according to the present invention includes a step of specifying an MPLS explicit route by adding, to an MPLS-to-IP forwarding function of one specified egress-and-ingress port group, a communication function with the MPLS-to-IP forwarding function of an intra-system other port group, and a forwarding function to the intra-system other port group.

A first packet router in a label switching system according to the present invention comprises a logical router configuring module for logically dividing a label switching router (LSR) into a plurality of LSRs each having a label switching function, and a module for specifying, when setting a label switched path on the basis of an explicit route specified, a port or a port group of an egress node.

A second packet router in a label switching system according to the present invention comprises a module for flooding, as topology data, a set of an intra-system port and an IP address allocated to the port, or a set of a port group among a plurality of groups into which the ports are divided, and an IP address allocated to the port group, and a module for managing the topology data flooded from other system and, when setting a label switched path on the basis of an explicit route specified, explicitly specifying a port or a port group of an egress node, and a port or a port group of a relay node on the basis of the received topology data.

A third packet router in a label switching system according to the present invention comprises a module for flooding, as topology data, a set of an intra-system port and an IP address allocated to the port, or a set of a port group among a plurality of groups into which the ports are divided, and an IP address allocated to the port group.

A fourth packet router in a label switching system according to the present invention comprises a module for flooding, as topology data, a set of an intra-system port and an IP address allocated to the port, or a set of a port group among a plurality of groups into which the ports are divided, and an IP address allocated to the port group by use of Opaque LSA of OSPF protocol.

A fifth packet router in a label switching system according to the present invention comprises a module for explicitly specifying, when setting a label switched path on the basis of an explicit route specified, a port or a port group of an egress node, and a port or a port group of a relay node.

A sixth packet router in a label switching system according to the present invention may further comprise a module for specifying a port or a port group of the egress node by setting an IP address corresponding to the port or the port group of the egress node in final ER-HOP-TLV in ER-TLVs in Label Request Message of CR-LDP, and a module for specifying a port or a port group of the relay node by setting an IP address corresponding to the port or the port group of the relay node in intermediate ER-HOP-TLV in ER-TLVs in Label Request Message of the CR-LDP.

A seventh packet router in a label switching system according to the present invention may further comprise a module for specifying the port or the port group of the egress node and the port or the port group of the relay node by adding an intra-system port number or an intra-system port group number in ER-HOP-TLV in ER-TLVs in Label Request Message of CR-LDP.

An eighth packet router in a label switching system according to the present invention may further comprise a module for explicating a port through which data should pass per system and specifying a port or a port group of the egress node by use of resource class TLV with ER-TLV in Label Request Message of CR-LDP being used as ER-HOP-TLV.

A ninth packet router in a label switching system according to the present invention may further comprise a module for specifying a port or a port group of the egress node by setting an IP address corresponding to the port or the port group of the egress node in final Subject-object in Explicit Route Objects in a path message of RSVP protocol extended for setting a label switched path in MPLS protocol, and a module for specifying a port or port group of the relay node by setting an IP address corresponding to the port or the port group of the relay node in intermediate Subject-object in Explicit Route Objects in the path message of the RSVP protocol.

A tenth packet router in a label switching system according to the present invention may further comprise a module for specifying a port or a port group of the egress node and a port or a port group of the relay node by adding an intra-system port number or an intra-system port group number in Subject-object in Explicit Route Objects in the path message of RSVP protocol extended for setting the label switched path in MPLS protocol.

An eleventh packet router in a label switching system according to the present invention includes a module for specifying an MPLS explicit route by adding, to an MPLS-to-IP forwarding function of one specified egress-and-ingress port group, a communication function with the MPLS-to-IP forwarding function of an intra-system other port group, and a forwarding function to the intra-system other port group.

According to the present invention, it is feasible to actualize MPLS on the packet router taking the architecture of mounting an IP/MPLS forwarder in an adapter at an egress for packets in terms of a mounting space and a mounting cost. As a result, MPLS utilizing the existing system architecture can be easily mounted.

Further, according to the present invention, when setting an explicit LSP, it is possible to attain routing elaborate enough to specify the ports or the port groups of the relay node and of the egress node. As a result, there is yielded a effect of expanding a range of utilizing an application making use of MPLS such as traffic engineering etc.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which:

FIG. 13 is an explanatory chart showing an example of definition of Opaque LSA of OSPF;

FIG. 14 is an explanatory chart showing an example of definitions of Label Request Message of CR-LDP, ER-TLV, ER-HOP-TLV and resource class TLV;

FIG. 15 is an explanatory chart showing an example of definitions of Label Request Message of CR-LDP, ER-TLV, ER-HOP-TLV and resource class TLV;

FIG. 16 is an explanatory chart showing an example of additional definition of ER-HOP-TLV;

FIG. 17 is an explanatory chart showing an example of definitions of Path Message of RSVP Extension, and Explicit-Route Object and IPv4 Subobject;

FIG. 18 is an explanatory chart showing an example of additional definition of Subobject of Explicit-Route Object;

DETAILED DESCRIPTION OF THE PREFERRED EMBODIMENTS

Embodiments of the present invention will herein after be described with reference to the accompanying drawings.

First Embodiment

Figure 8:
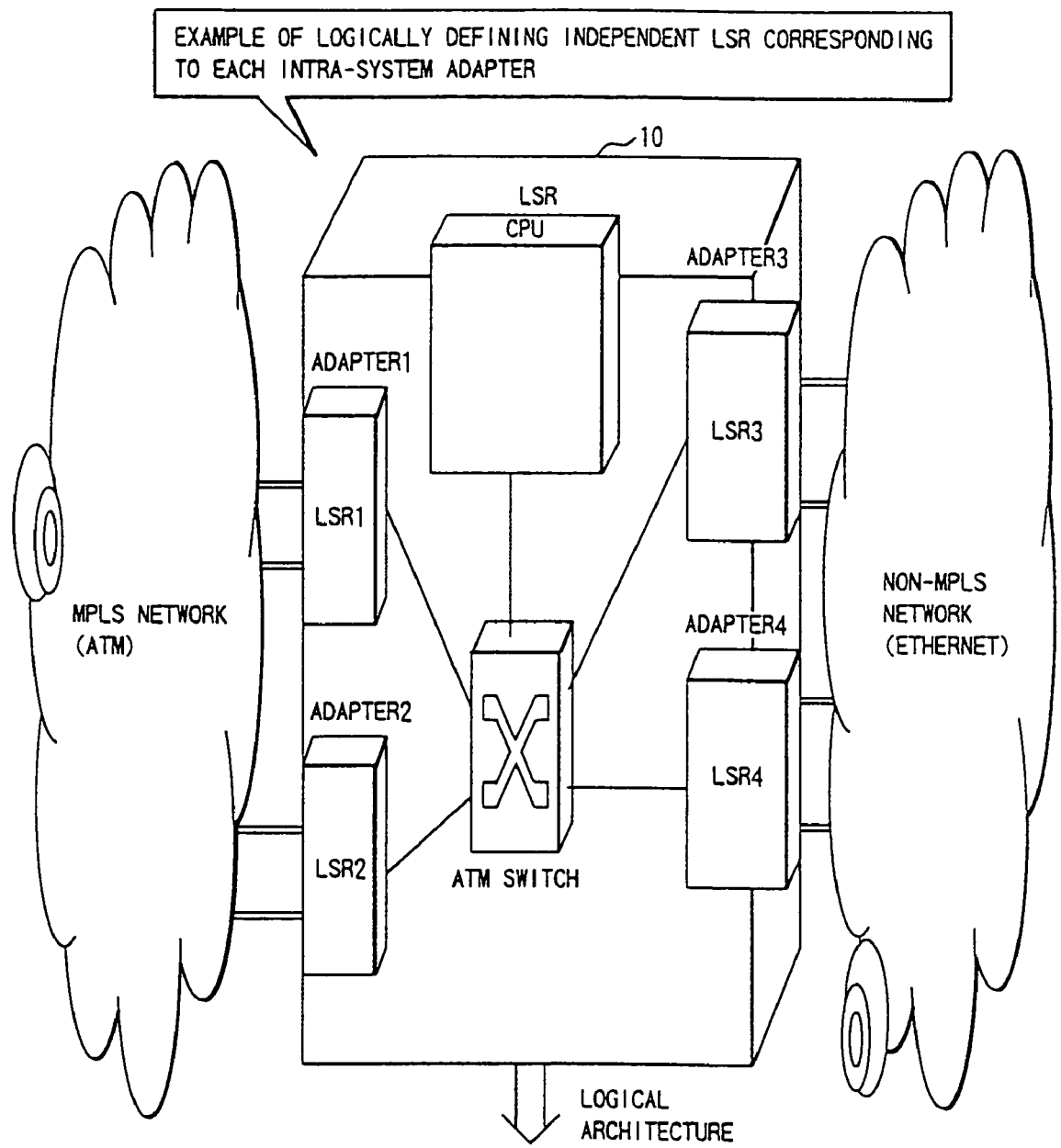
FIG. 8 is a block diagram showing an architecture of an LSR in a first embodiment of the present invention.
Figure 9:
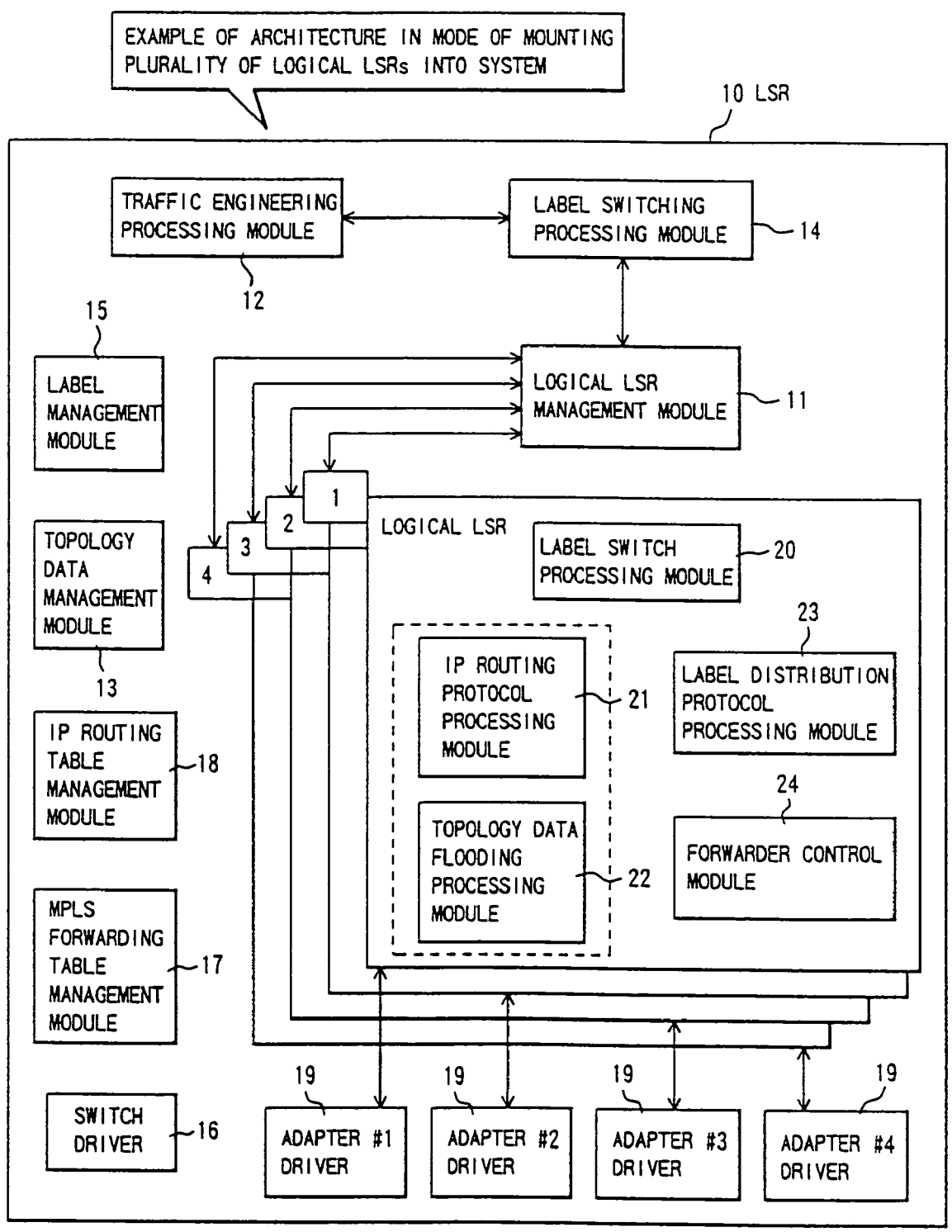
FIG. 9 is a block diagram showing a detailed architecture of an LSR in the first embodiment.
Figure 10:
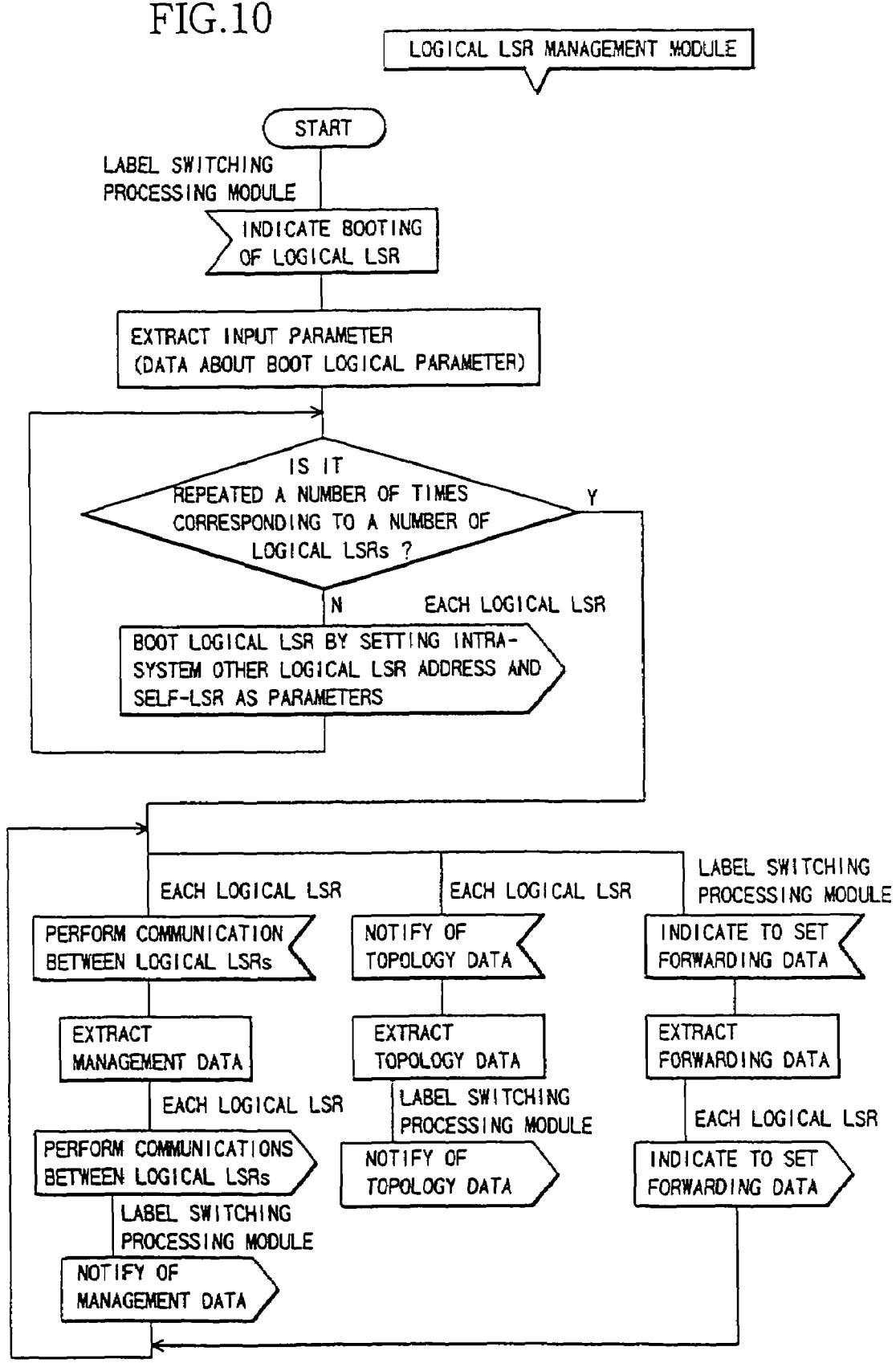
FIG. 10 is an explanatory flowchart showing an operation of the LSR in the first embodiment.

A label switching router (LSR) classified as a packet router in a first embodiment of the present invention, will be explained referring to FIGS. 8, 9 and 10 in combination. FIGS. 8 and 9 show an architecture of the LSR. FIG. 10 shows a processing flowchart.

A label switching router (LSR) 10 in the first embodiment adopts an architecture of logically mounting a plurality of LSRs in a system. The independent LSR is logically defined corresponding to each adapter (corresponding to a port group) within the LSR 10, and each adapter within the system is recognized as an independent LSR by other LSRs.

As shown in FIG. 8, an architecture of the LSR 10 is that adapters 1 and 2 are connected to an MPLS network (ATM), and adapters 3 and 4 are connected to a non-MPLS network (Ethernet) With respect to this LSR 10, LSR 1, LSR 2, LSR 3 and LSR 4 are defined as logical LSRs, and the respective LSRs are connected in full-mesh, corresponding to the adapters 1, 2, 3 and 4.

Based on this architecture, communications (based on a routing protocol, and a label distribution protocol) with other LSRs are performed. At this time, the LSR1, LSR 2 are not connected to the non-MPLS network, and it may therefore be sufficient that the LSR 1 and LSR 2 each incorporate a function as a relay node. The LSR 1 and LSR 2 have neither a necessity of terminating the LSP nor a necessity of incorporating an IP/MPLS forwarding function, accordingly.

Other LSRs are thereby capable of recognizing the LSR 10 as the independent LSR 1, LSR 2, LSR 3, LSR 4, and, when setting the LSP for transferring packets which are to be forwarded to a network connected to the LSR 3. The LSP can be set with the LSR 3 serving as an egress node. Namely, the LSP can be terminated by the adapter 3.

To describe it in greater details, as shown in FIG. 9, the logical LSRs 1, 2, 3 and 4 are defined corresponding to the adapters, and further a component for managing each of the logical LSRs is defined.

With these definitions, the respective logical LSRs 1, 2, 3 and 4 are capable of independently operating with respect to an outside system. Inside the system, a logical LSR management module 11 manages and integrates the logical LSRs 1, 2, 3 and 4, whereby a function as one single LSR can be attained.

Traffic engineering is classified as one of most useful applications of the MPLS, and aims at optimizing an activity ratio of network resources and optimizing a forwarding performance of the traffic. A traffic engineering processing module 12, based on a database managed by a topology data management module 13, calculates an optimal set route of the LSP, detects triggers for adding, changing and deleting the route, and determines a flow of allocating to the set LSP.

Further, the traffic engineering processing module 12, based on the results given above, indicates a label switching processing module 14 to set, add, change and delete the LSP, and allocate and change the flow to the LSP. Moreover, the traffic engineering processing module 12 receives a result of processing and a report on the LSP set in response to a request made by other LSR from the label switching processing module 14, and reflects this result in the database of the topology data management module 13. A part of the whole of the flow allocating process to the LSP may be executed by an MPLS forwarder on the adapter.

The label switching processing module 14, in accordance with an indication given from the traffic engineering processing module 12, requests the logical LSRs 1, 2, 3 and 4 to set, add, change and delete the LSP via the logical LSR management module 11. Further, the label switching processing module 14 receives other LSR's requests for setting, adding, changing and deleting the LSP from the LSR management module 11 via the logical LSRs 1, 2, 3 and 4, and requests the logical LSRs 1, 2, 3 and 4 to execute these processes via the logical LSR management module 11.

When executing those processes, labels are caught and released by communications with a label management module 15, and at the same time a switch driver 16 is requested to execute switching from an input label to an output label. Furthermore, an MPLS forwarding table is updated by communications with an MPLS forwarding table management module 17, and a part of copies of the MPLS forwarding table to the logical LSRs 1, 2, 3 and 4 via the logical LSR management module 11.

The logical LSR management module 11 controls the communications with the logical LSRs 1, 2, 3 and 4, and executes mutual translations between a logical architecture and a physical architecture with respect to the communications between the label switching processing module 14 and the logical LSRs 1, 2, 3 and 4. To be more specific, the logical LSR management module 1 maps a physical-architecture-based request given from the label switching processing module 14 to the logical architecture, and notifies the logical LSRs 1, 2, 3, 4 of this mapping. Reversely, the logical LSR management module 11 maps logical-architecture-based requests given from the logical LSRs 1, 2, 3, 4 to the physical architecture, and notifies the label switching processing module 14 of this mapping.

The label management module 15, the topology data management module 13, the IP routing table management module 18 and the MPLS forwarding table management table 17, manage the respective databases thereof, and provide functions of searching and updating these databases.

The switch driver 16 controls an ATM switch Fabric (core switch), and sets and deletes the LSP. An adapter #n driver 19 provides the logical LSRs 1, 2, 3 and 4 with an adapter control function.

The label switching processing modules 20 in the logical LSRs 3 and 4 manage the whole of the logical LSRs 1, 2, 3, 4, and execute a virtual label switching process in response to indications given from the logical LSRs 1, 2, 3 and 4. That is, the label switching processing module 14 and the logical LSR management module 11 carry out operations of managing the intra-system LSPs, allocating the labels, performing switch control, and updating the IP routing table and the MPLS forwarding table, and controls a protocol process with outside LSRs.

IP routing protocol processing modules 21 in the logical LSRs 3 and 4, execute the processes of protocols such as OSPF, RIP2, BGP4 etc. A topology data flooding processing module 22 executes a protocol process relative to a flood of the topology data for the traffic engineering independently of the topology process pertaining to the IP routing. Mounting thereof may, however, also be what is integrated as a protocol into which the routing protocol of the IP routing protocol processing module 21 is extended.

The label distribution protocol processing modules 23 in the logical LSRs 3 and 4 execute a label distribution protocol such as LDP, CR-LDP, RSVP Extension etc. A forwarder control module 24 controls a forwarder mounted into the adapter. That is, the forwarder control module 24 initializes and updates an IP forwarding table and an MPLS forwarding table that are possessed by the forwarder.

Further, the label switching processing modules 20, the IP routing protocol processing modules 21, the topology data flooding processing modules 22, the label distribution protocol processing modules 23 and the forwarder control modules 24 in the logical LSRs 1 and 2, are the same functions as those modules in the logical LSRs 3 and 4. Note that the logical LSRs 1 and 2 do not terminate the MPLS/IP, and hence the forwarder control modules 24 have no necessity of being operated.

With the above architecture (a software architecture may also be taken) adopted, as a result, an explicit route with a specified egress adapter of the egress node can be set.

Second Embodiment

Figure 11:
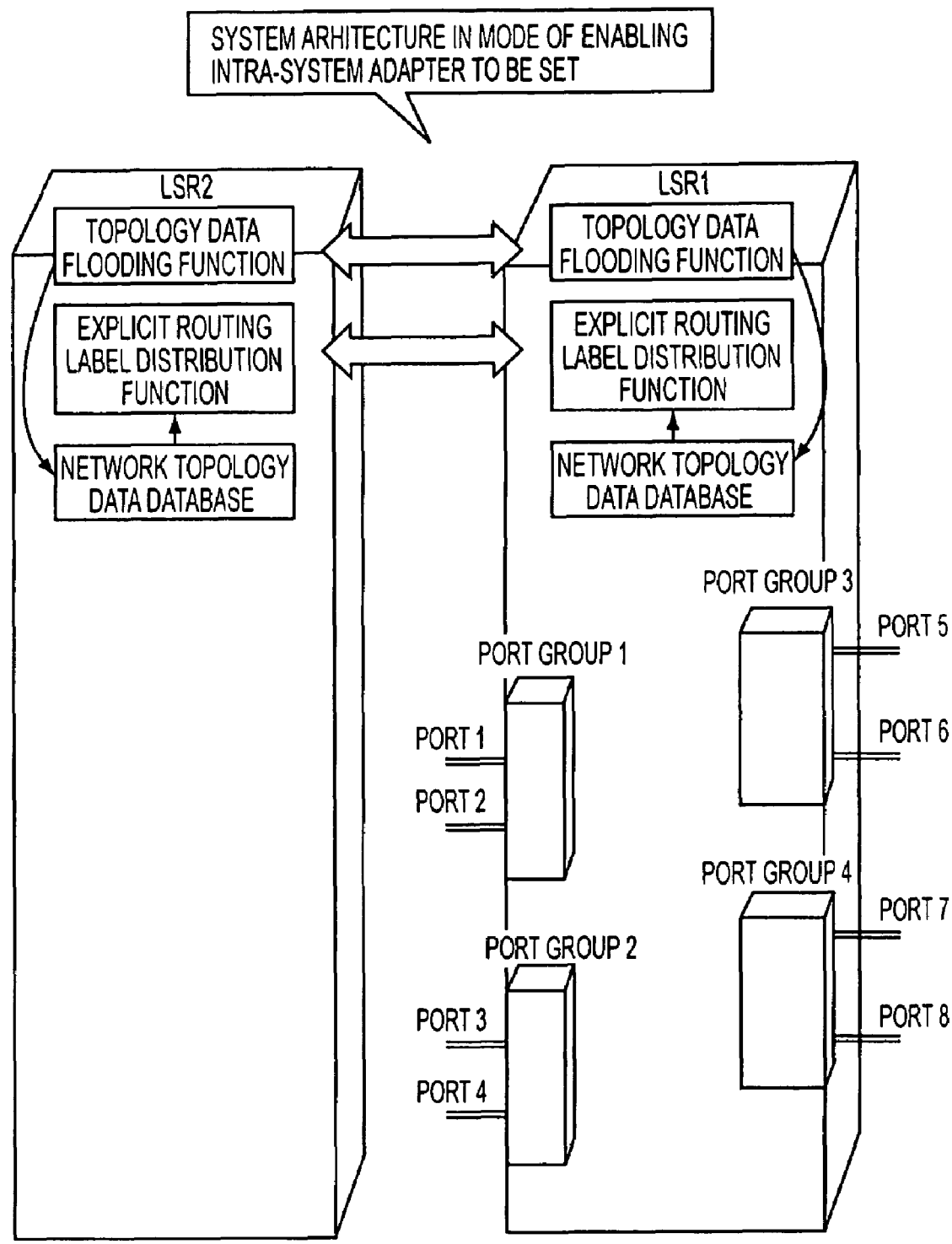
FIG. 11 is a block diagram showing an architecture of the LSR in a second embodiment of the present invention.
Figure 12:
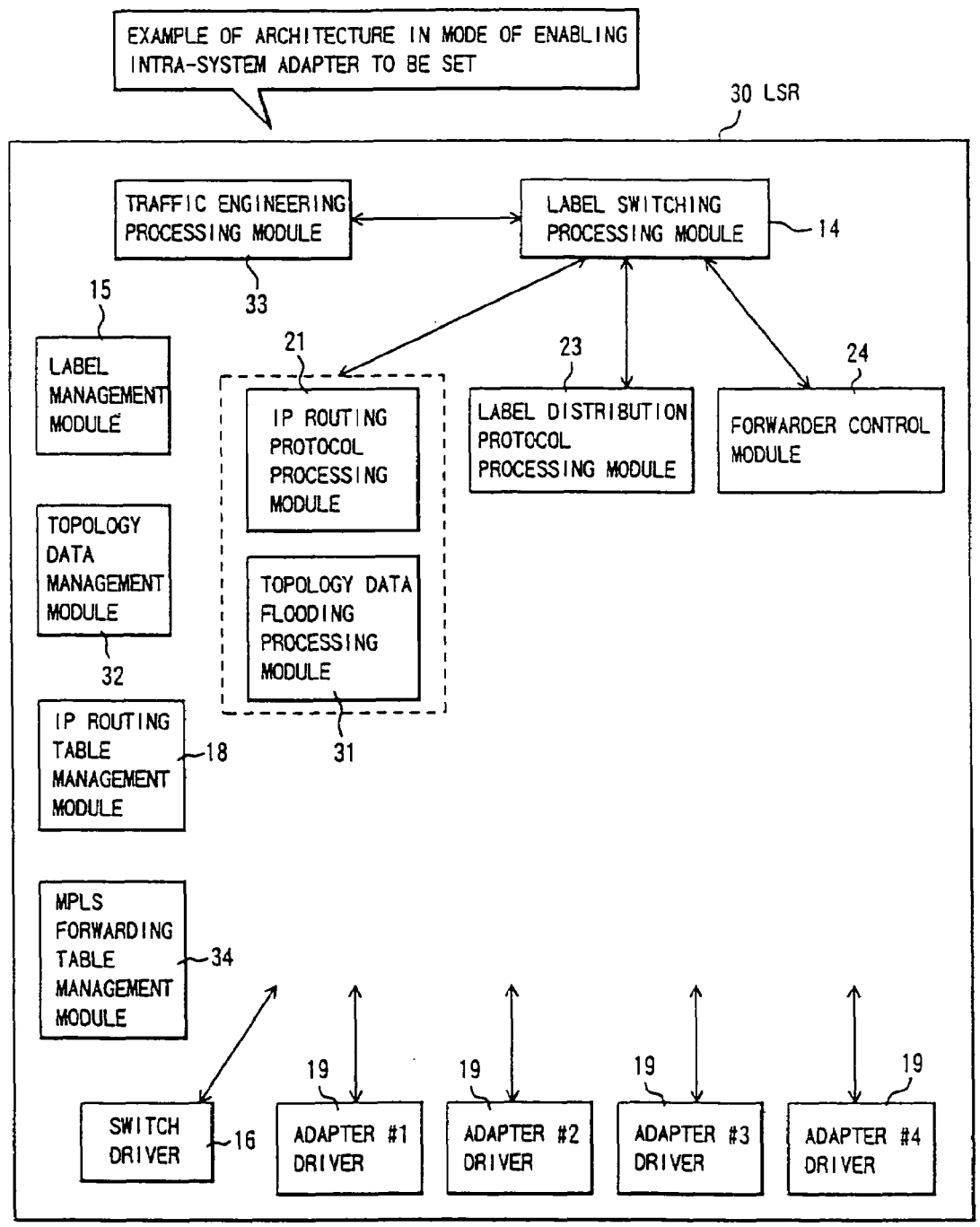
FIG. 12 is a block diagram showing a detailed architecture of the LSR in the second embodiment.
Figure 19:
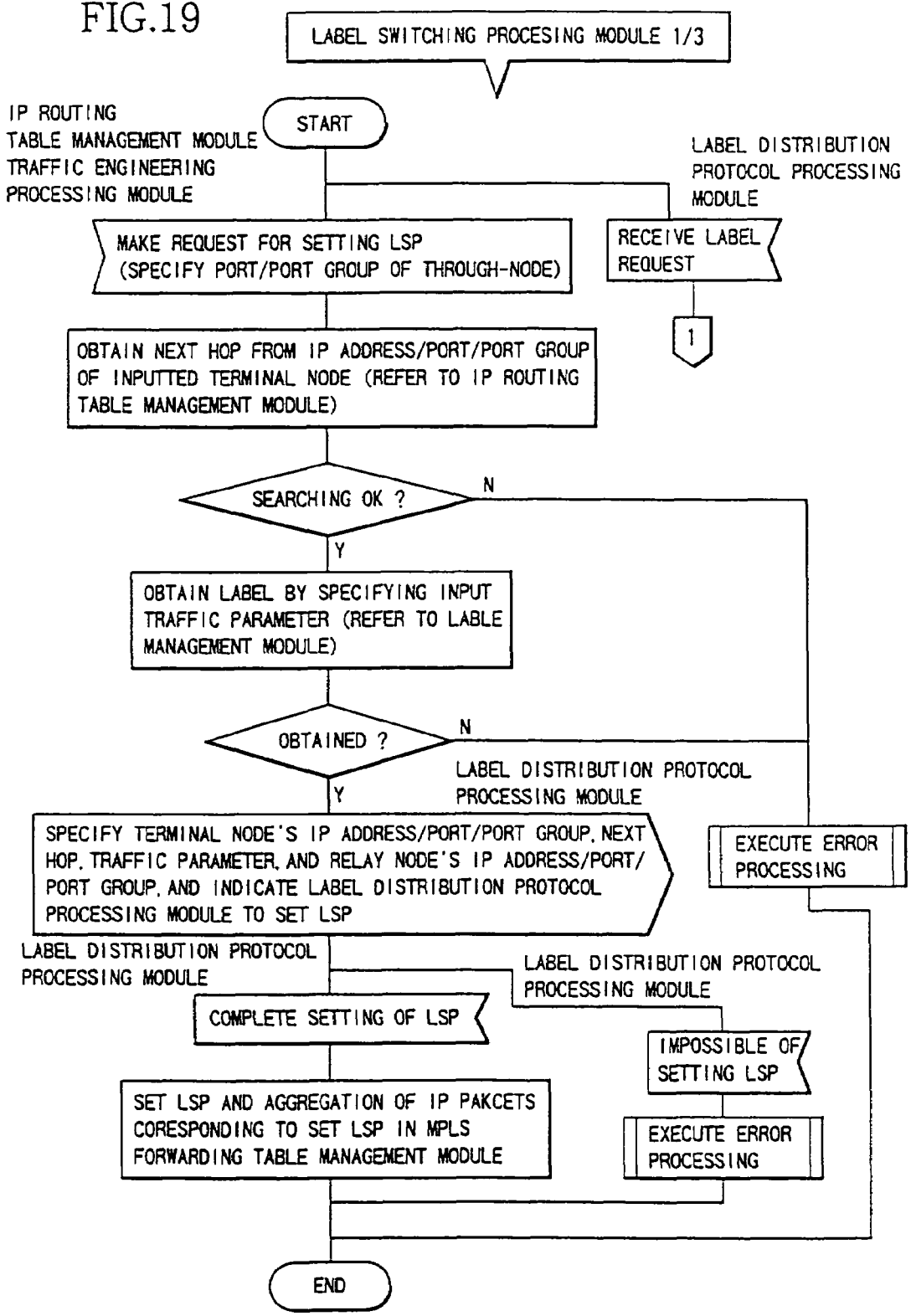
FIG. 19 is an explanatory flowchart showing an operation of the LSR in the second embodiment.
Figure 20:
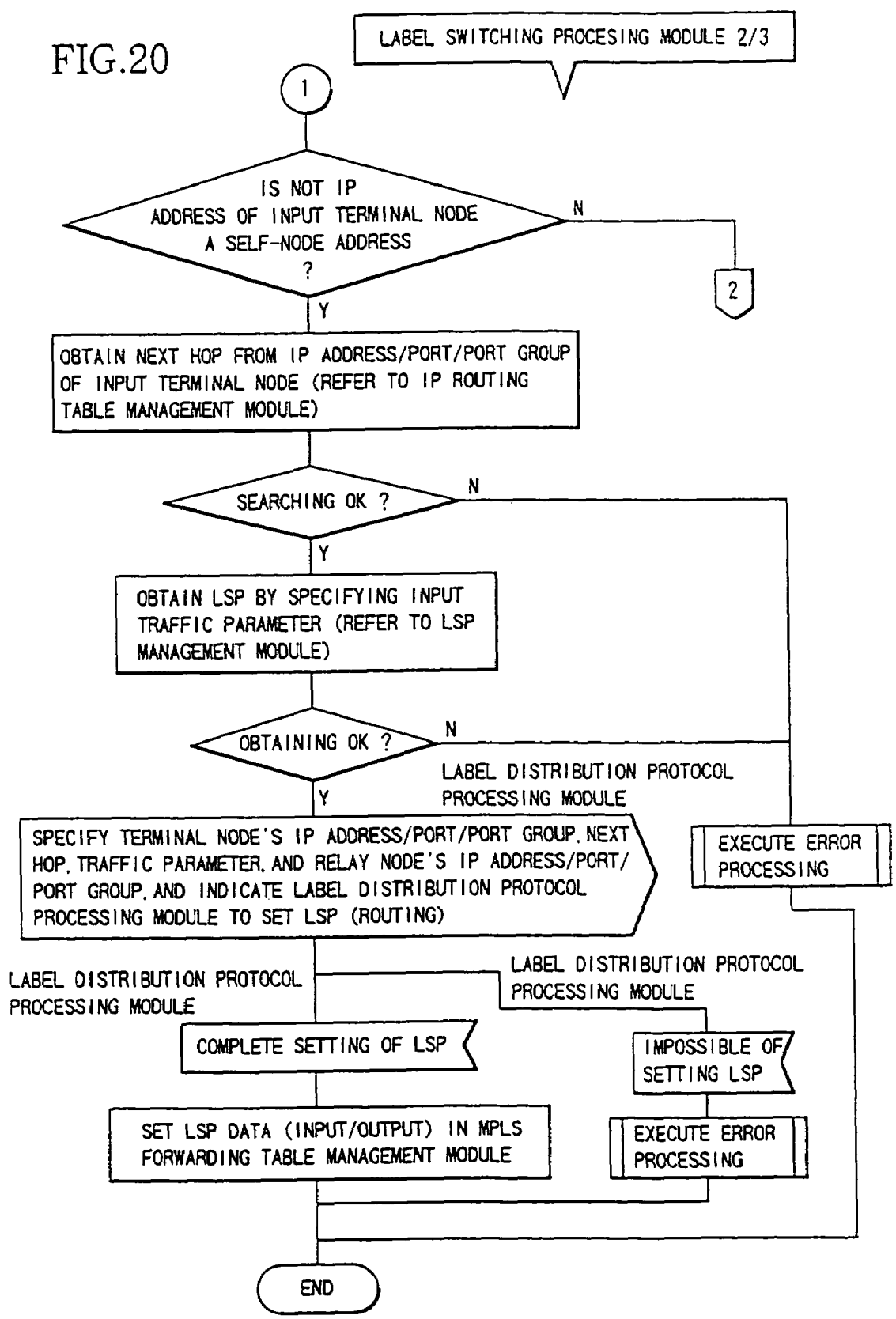
FIG. 20 is an explanatory flowchart showing the operation of the LSR in the second embodiment.
Figure 21:
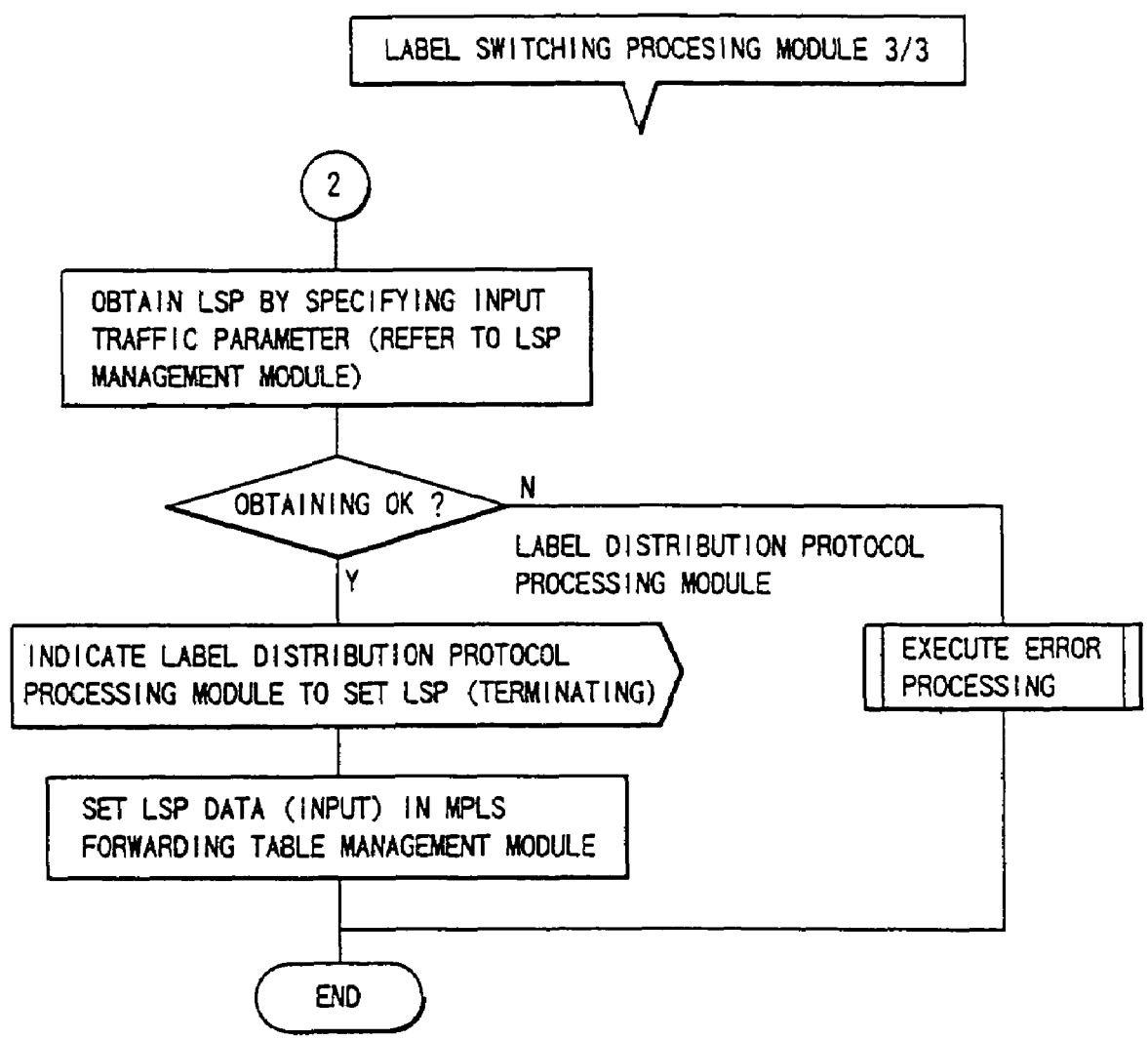
FIG. 21 is an explanatory flowchart showing the operation of the LSR in the second embodiment.

The label switch router (LSR) serving as a packet router in a second embodiment of the present invention will be described with reference to FIGS. 11, 12, 13 through 18, 19, 20 and 21 in combination. FIGS. 11 and 12 show an architecture of the label switch router (LSR). FIGS. 13 through 18 show examples of a variety of definitions of the protocols for the traffic engineering. FIGS. 19, 20 and 21 are flowcharts showing the processes.

A label switching router (LSR) 30 in the second embodiment takes such an architecture that the intra-system adapters can be specified.

As shown in FIG. 11, the LSR 30 has a database stored with various items of topology data of the network. The LSR 30 incorporates a function of flooding the topology data on the basis of the database, and a function of updating the database on the basis of the flooded topology data. Further, the LSR 30 has a label distributing function (LSO setting function) by which an explicit route is specified based on the database.

Further, the LSR 30 incorporates a function (1) of rearranging ports and an aggregation of the ports into groups and thus managing the ports, a function (2) of flooding the port and/or a group number of the port to an address of a connection destination network, a function (3) of structuring the flooding data including the above item (2) into a database, a function (4) of determining, based on the database in the item (3), an explicit route inclusive of the port or the port group in addition to nodes through which the packets pass, and a function (5) of distributing the labels by giving the explicit route determined in the item (3).

The topology data sub-itemized down to the port groups or the ports of the relay node and the egress node can be managed at an ingress node, and it is feasible to set not only a port group of the egress node or an LSP with the specified port but also a port group or a port of the relay node through which the packets pass.

To explain it in full depth, as shown in FIG. 12, in an LSR 30, management functions corresponding to the respective ports and the port group (corresponding to the adapters) of other system and the self-system, are added to the components indicated by hatching. In this LSR 30, a port management is carried out in the way of allocating ports 1, 2 to a port group 1, ports 3, 4 to a port group 2, ports 5, 6 to a port group 3, and ports 7, 8 to a port group 4.

Moreover, what is added to the LSR 30 is a function of flooding a port or/and a group number of the port to an address of a connection destination network. At the present, the function of flooding the topology data is supported by the routing protocol such as OSPF etc. There is further made a proposal of adding a function to OSPF and flooding the topology data for the traffic engineering (independently of the topology data for the IP routing) (which involves the use of Opaque LSA (Link State Advertisement) of OSPF).

This example is illustrated in FIG. 13. This type of LSA is newly defined and then flooded, whereby each system receives LSA from other system and, as a result, the topology data for the traffic engineering can be obtained. A link and an interface in FIG. 13 correspond to the ports.

Basically, this is used, however, this concept is further extended, and the port group is added to Sub-TVLV defined in FIG. 13. To give an example of the definition, sub-TVLV type: 7, length (octets): 1, value (octet): 4, name: port group number. Further, a port group number is allocated to a resource class TLV. Thus, the port group number is defined, whereby the port group number can be flooded. This function is incorporated into a topology data flooding processing module 31.

A function of converting the flooding data into a database is added to the LSR 30. In addition to the topology data for the traffic engineering, which are flooded with opaque LSA of OSPF shown in FIG. 13, the port group numbers flooded by the topology data flooding processing module 31 are also converted into a database. This function is incorporated into the topology data management module 32 and the traffic engineering processing module 33.

In the LSR 30, a function of determining the explicit route inclusive of the port or the port group is added. Based on the databases of the topology data management module 32 and of the traffic engineering processing module 33, the explicit route of the LSP from the ingress node to the output port of the egress node, is determined by a local policy or a managerial selection. This function is incorporated into the traffic engineering processing module 33.

Further, in the LSR 30, the following function of distributing the labels by explicating the port or the port group, is added.

(1) ER HOP TLV in Label Request Message of CR-LDP shown in FIGS. 14 and 15 specifies a node (system) through which essentially the LSP passes. This is extensively defined, and final ER HOP TLV in ER TLVs shall indicate an output port group of the egress node.

The ingress node, based on the determination of the explicit route, specifies an IP address (corresponding to any one of ports in the port group) corresponding to the output port group of the egress node in final ER HOP TLV in ER TLVs in the Label Request Message.

The egress node specifies an output port in accordance with the IP address indicated in final ER HOP TLV in ER TLVs in Label Request Message, and may further specify a port group to which that port belongs.

(2) IPv4 Subobject in EXPLICIT_ROUTE object in Path Message of RSVP Extension shown in FIG. 17, specifies a node (system) through which essentially the LSP passes. This is extensively defined, and final IPv4 Subobject in EXPLICIT_ROUTE object shall indicate an output port group of an egress node. This is RSVP Extension version in the item (1).

(3) As shown in FIG. 16, the port and the port group (a link and a link group) are additionally defined in ER HOP type of ER HOP TLV, and further a port and port group (link and link group) ELV is additionally defined.

The ingress node, based on the determination of the explicit route, specifies an output port group number or/and port number of the egress node in final ER HOP TLV in ER TLVs in Label Request Message by use of the port an port group (link and link group) TLV.

Further, as the necessity arises, the egress node may specify a port and a port group passing through the relay node in intermediate ER HOP TLV by use of the port and port group (link and link group) TLV.

(4) As shown in FIG. 18, the port and the port group (the link and the link group) are additionally defined in Subobject type of EXPLICIT_ROUTE object, and further port and port group (link and link group) Subobject is additionally defined. This is RSVP Extension version in the item (3).

(5) As shown in FIG. 16, a resource class is additionally defined in ER Hop type of ER HOP TLV. Further, resource class TLV shown in FIG. 15 is used as ER HOP TLV.

The ingress node, based on the determination of the explicit route, uses resource class TLV in final ER HOP TLV in ER TLVs in Label Request Message, and specifies an output port group number of the egress node.

The egress node may specify an output port group number from the output port group number indicated by final ER HOP TLV in ER TLVs in Label Request Message.

Further, as the necessity arises, resource class TLV is used in intermediate ER HOP TLV, whereby a port group passing through a relay node can be specified.

The topology data sub-itemized down to the port groups or the ports of the relay node and the egress node can be managed at the ingress node, and it is feasible to set an LSP with the specified port group or port of the egress node, and to specify the port group or port of the relay node through which the packets pass.

Note that the same components of the LSR 30 shown in FIG. 12 as those of the LSR 10 shown in FIG. 9 are marked with the same reference numerals.

Third Embodiment

The label switching router (LSR) classified as the packet router in a third embodiment of the present invention, will be explained referring to FIGS. 22, 23, 24, and 25 in combination.

Figure 22:
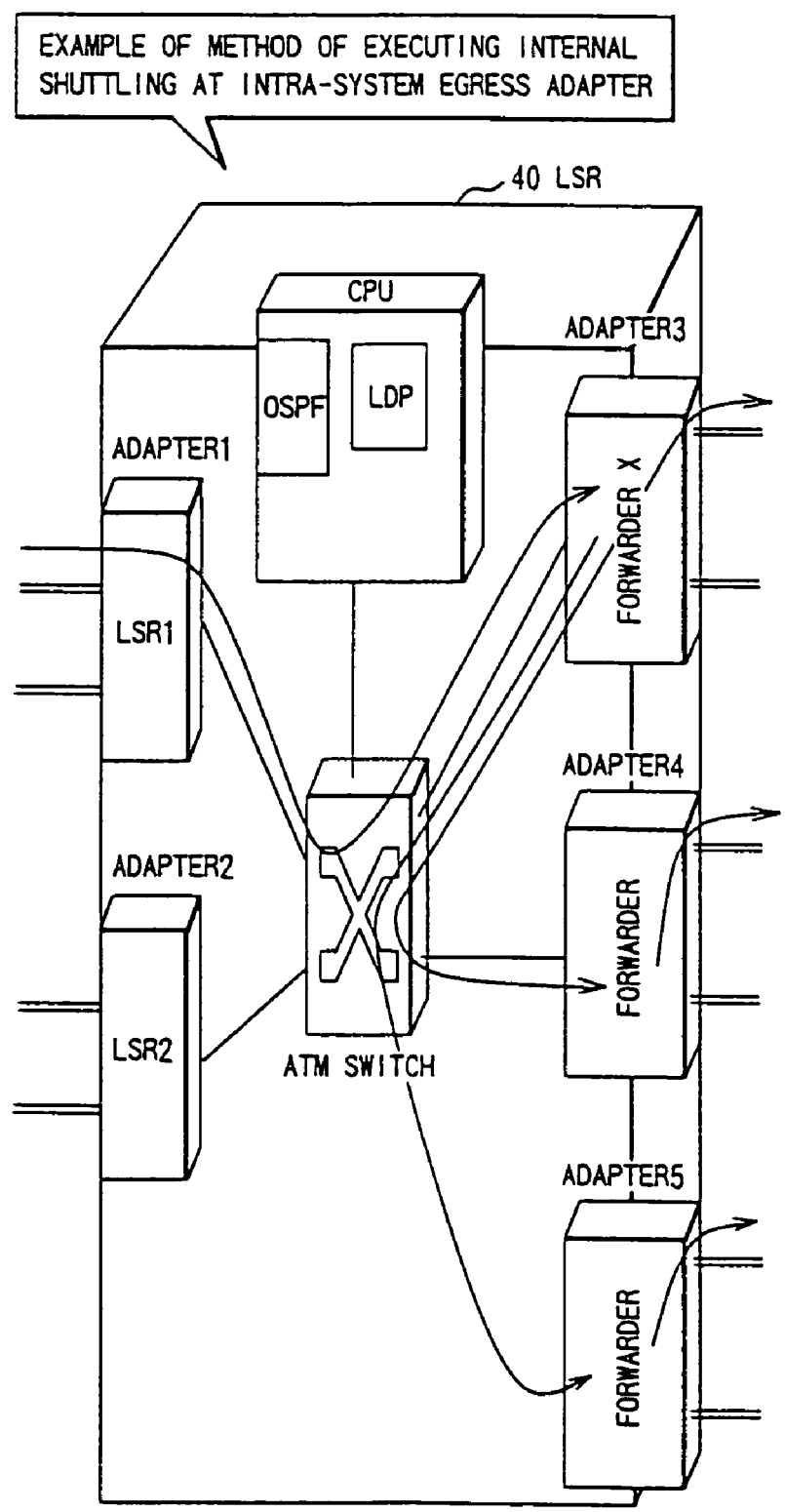
FIG. 22 is a block diagram showing an architecture of the LSR in a third embodiment of the present invention.

A label switching router (LSR) 40 in the third embodiment takes such an architecture that an egress adapter within the system is capable of executing internal shuttling. As shown in FIG. 22, the LSR40 has, in the system architecture illustrated in FIG. 2, an addition of the following functions to one specified egress adapter. That is, these functions are a function (1) of setting a connection with other egress adapter via an ATM switch, a function (2) conducting IP forwarding to other adapters in addition to the intra-adapter ports (which uses the connection given in the item (1), and a function (3) of adding routing data to other adapters to a routing table that is referred in the item (2).

Figure 1:
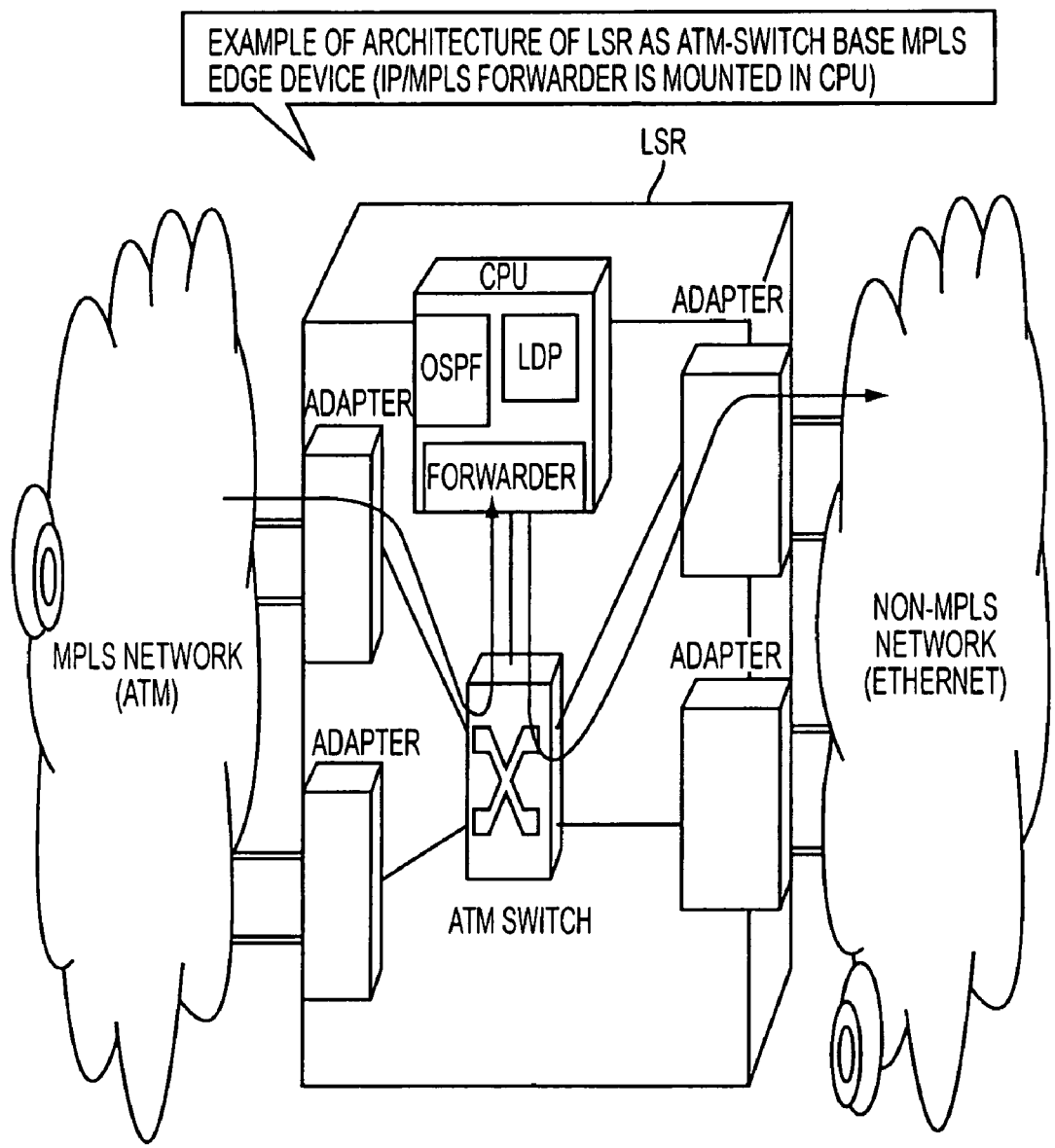
FIG. 1 is a block diagram showing an example of architecture of a conventional LSR.
Figure 2:
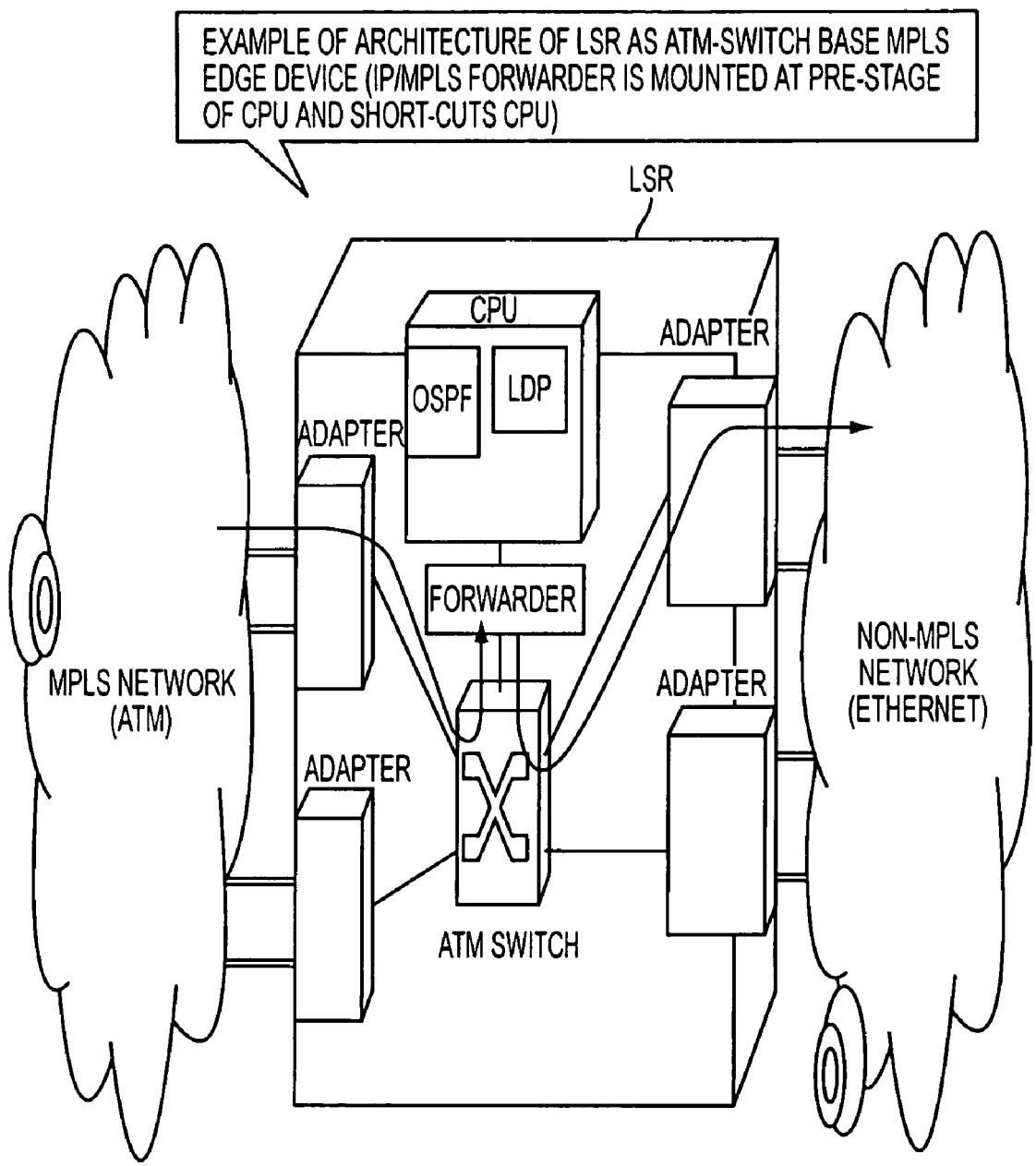
FIG. 2 is a block diagram showing an example of architecture of the conventional LSR.
Figure 3:
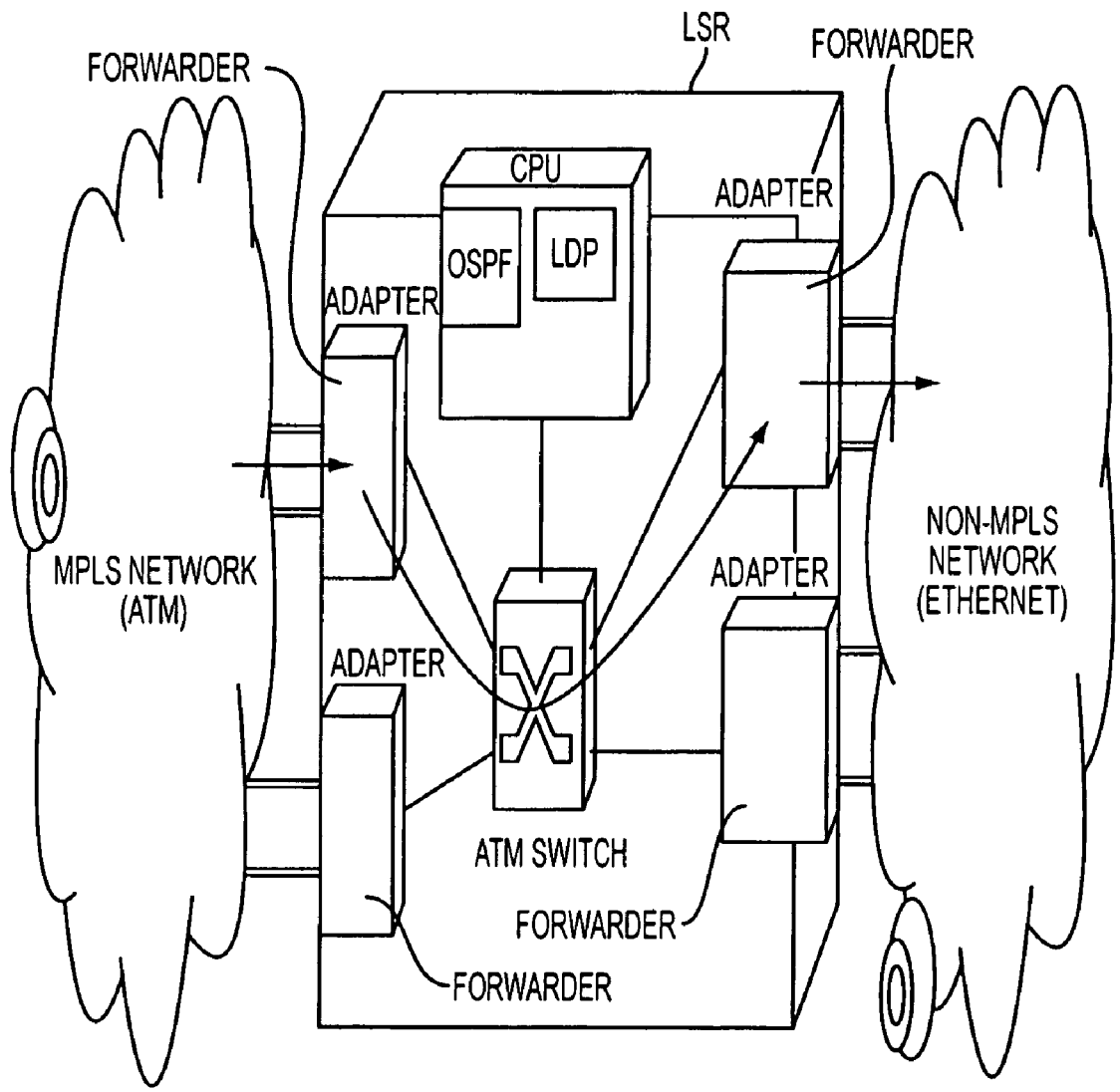
FIG. 3 is a block diagram showing an example of architecture of the conventional LSR.
Figure 4:
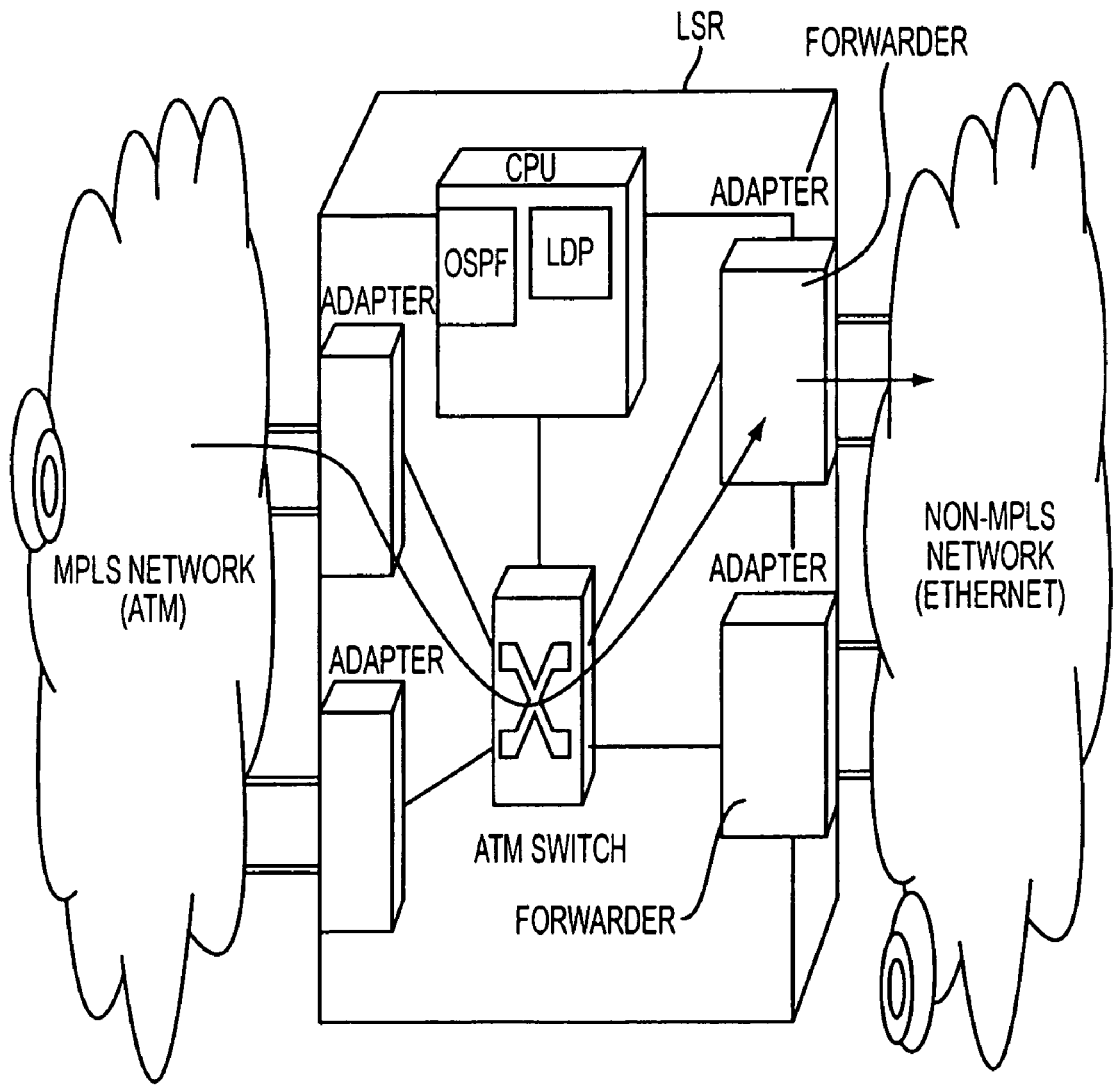
FIG. 4 is a block diagram showing an example of architecture of the conventional LSR.
Figure 5:
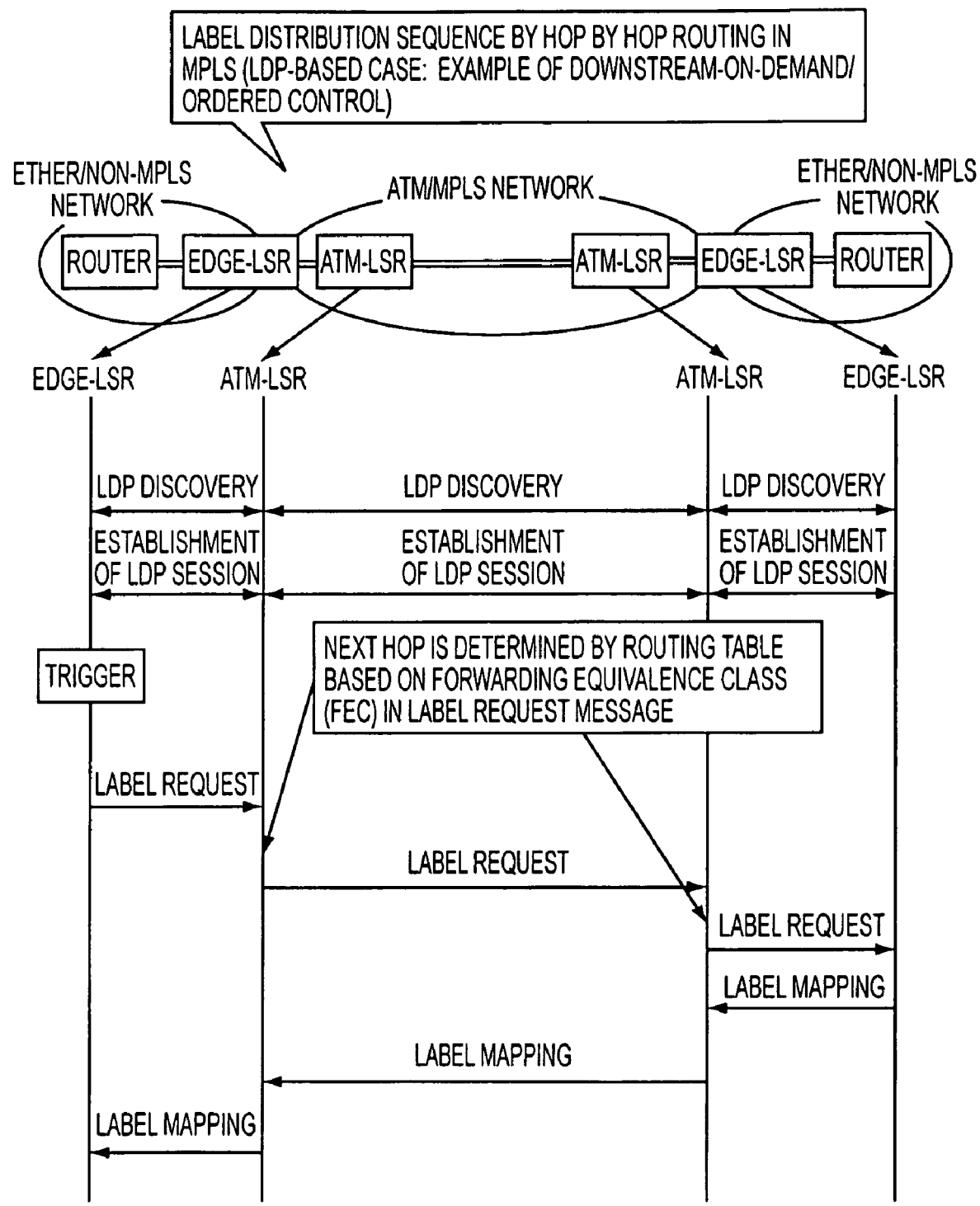
FIG. 5 is an explanatory view showing a conventional label distribution sequence.
Figure 6:
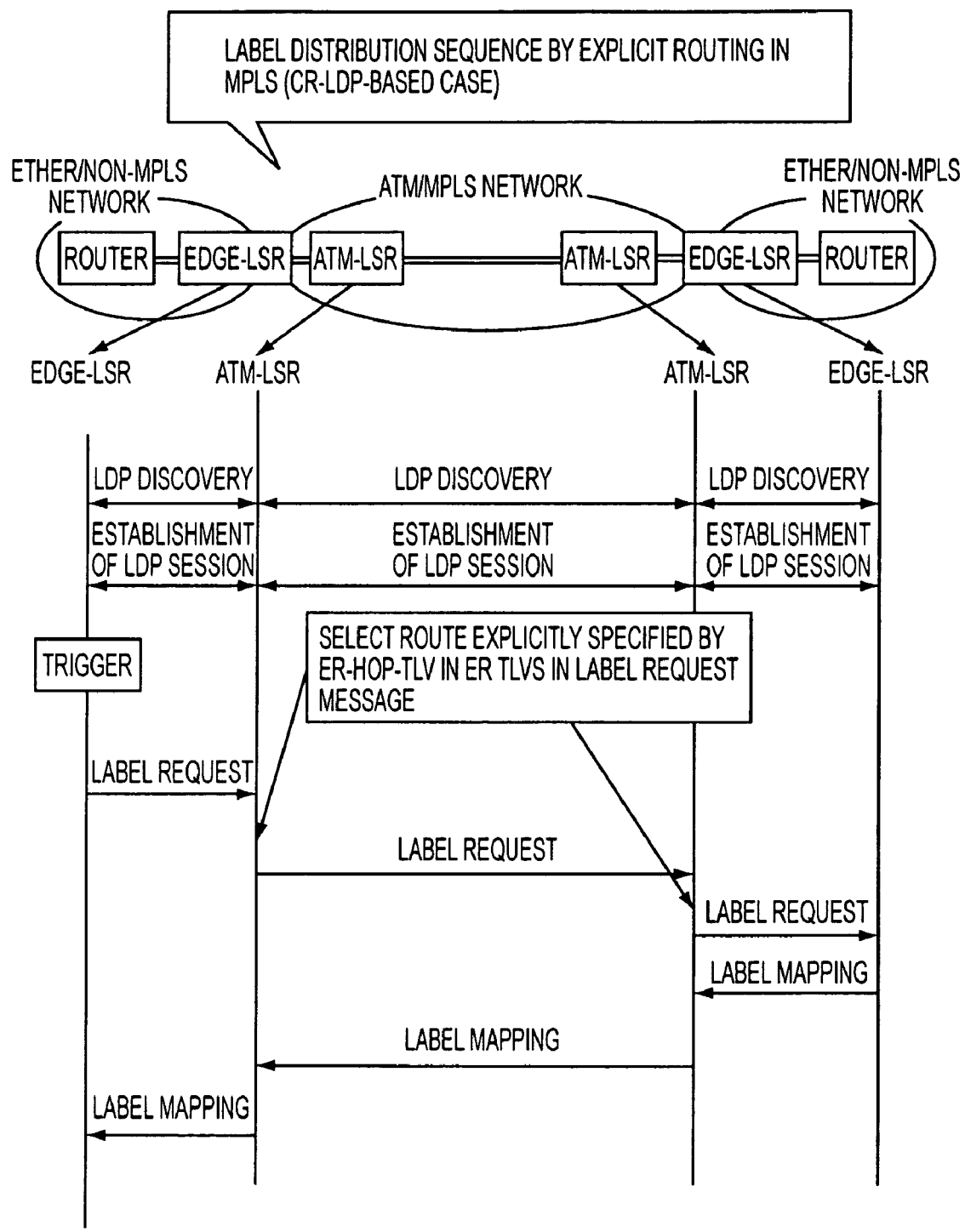
FIG. 6 is an explanatory view showing the conventional label distribution sequence.
Figure 7:
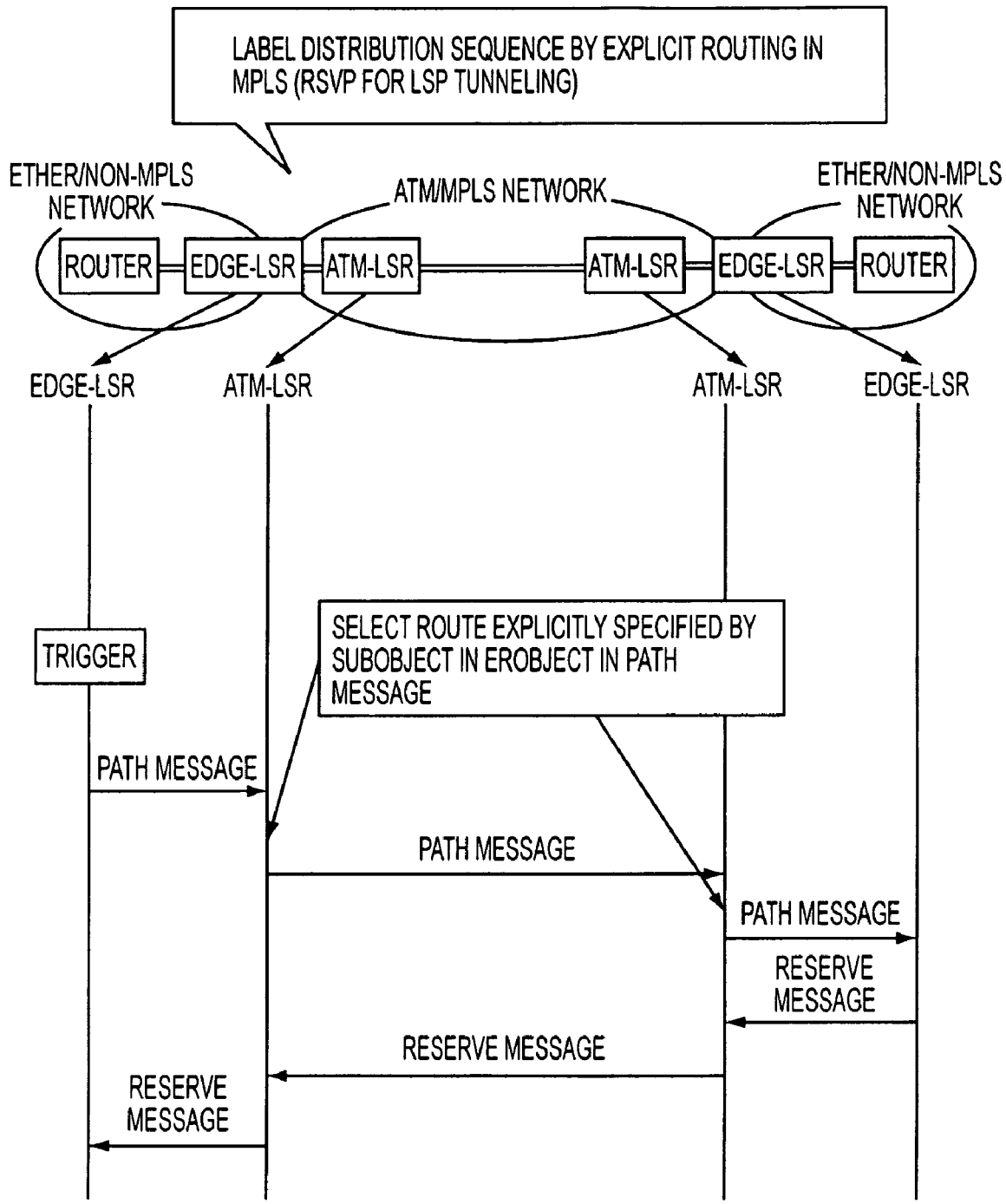
FIG. 7 is an explanatory view showing the conventional label distribution sequence.

With these functions added, the setting of the explicit LSP can be actualized neither by changing a basic framework (in terms of mounting) of the system architecture shown in FIG. 2 nor by the ingress node specifying (managing) the adapters of the egress node.

(Example of Architecture of IP/MPLS Forwarder)

Figure 23:
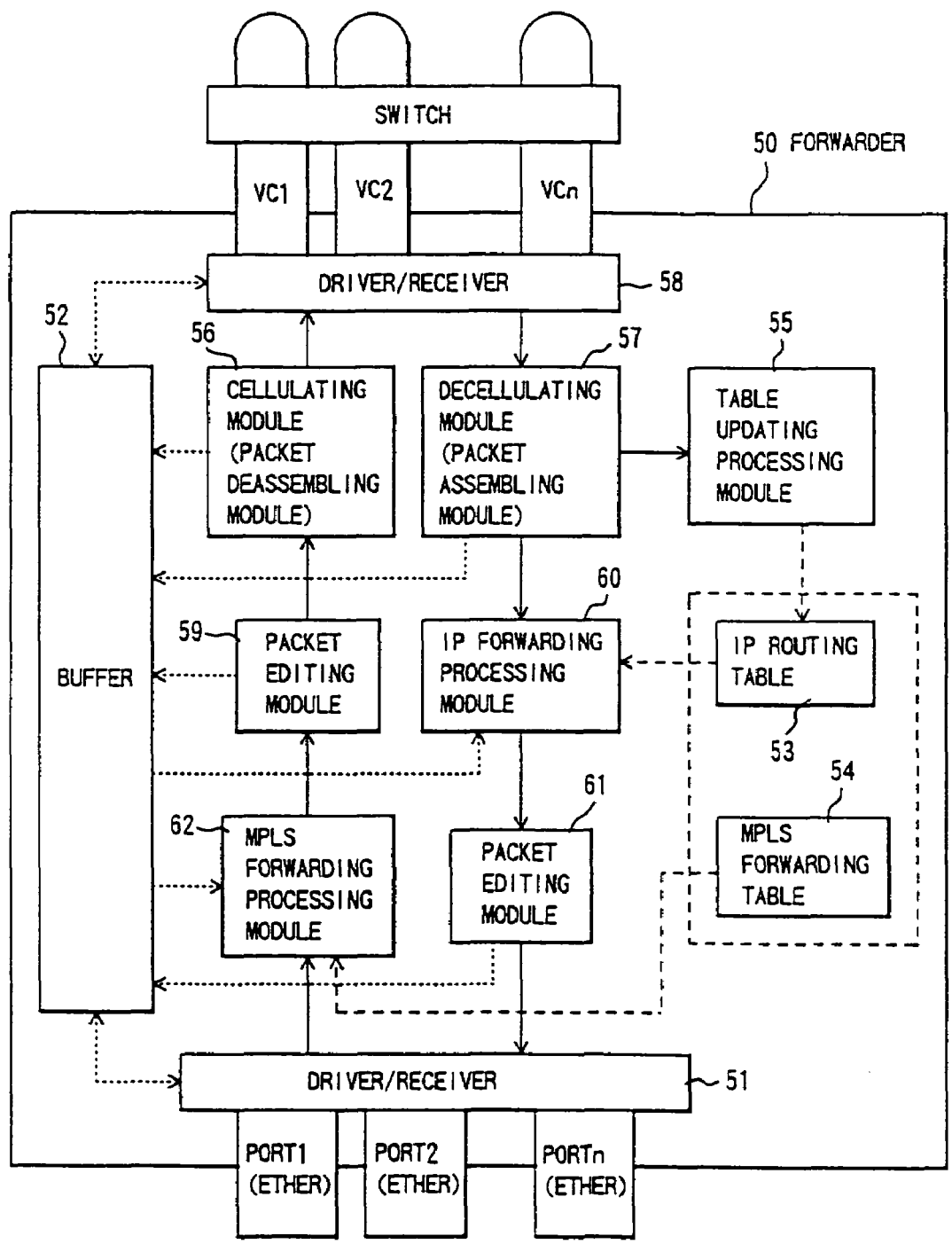
FIG. 23 is a block diagram showing a detailed architecture of a forwarder in the LSR in the third embodiment.

FIG. 23 shows an example of architecture of an IP/MPLS forwarder in the LSR 40 illustrated in FIG. 22. In an IP/MPLS forwarder 50, a driver/receiver 51 transmits and receives the data to and from an external interface (ATM/Ether). The received data is stored in a buffer 52, the driver/receiver 51 transfers the control, wherein an address and a size of the received data are set as output data. When in a data transmitting process, the driver/receiver 51 transmits the data stored in the buffer 52, wherein the address and the size thereof are set as input data.

The buffer 52 is stored with the received data and also edited data (transmitted data). The IP routing table 53 is a copy of a part of the IP routing table possessed by the LSR 40 body, and contains ports 1~n as output destination ports. An MPLS forwarding table (Label Information Base) 54 is a copy of a part of the MPLS forwarding table possessed by the LSR 40 body, and contains VCs 1~n as output destination ports.

A table updating processing module 55 executes a process of updating the IP routing table 53 and the MPLS forwarding table 54 in response to an indication given from an LSR body control unit. A cellulating module (packet deassembling module) 56 cellulates the packets which have already been edited, and indicates the driver 58 to transmit the cells by specifying a VC. A decellulating module (packet assembling module) 57 decellulates the received cells from the receiver 58, and assembles them into packets on the buffer 52.

A packet editing module 59 executes a process of editing an IP header and an MPLS header of the packet. An IP forwarding processing module 60 determines a packet transmitting destination with reference to the IP routing table 53, and indicates the packet editing module 61 to edit the IP header. An MPLS forwarding processing module 62 determines a packet transmitting destination with reference to the MPLS forwarding table 54, and indicates the packet editing module 61 to edit an MPLS header.

(First Example of Architecture of IP/MPLS Forwarder (X))

Figure 24:
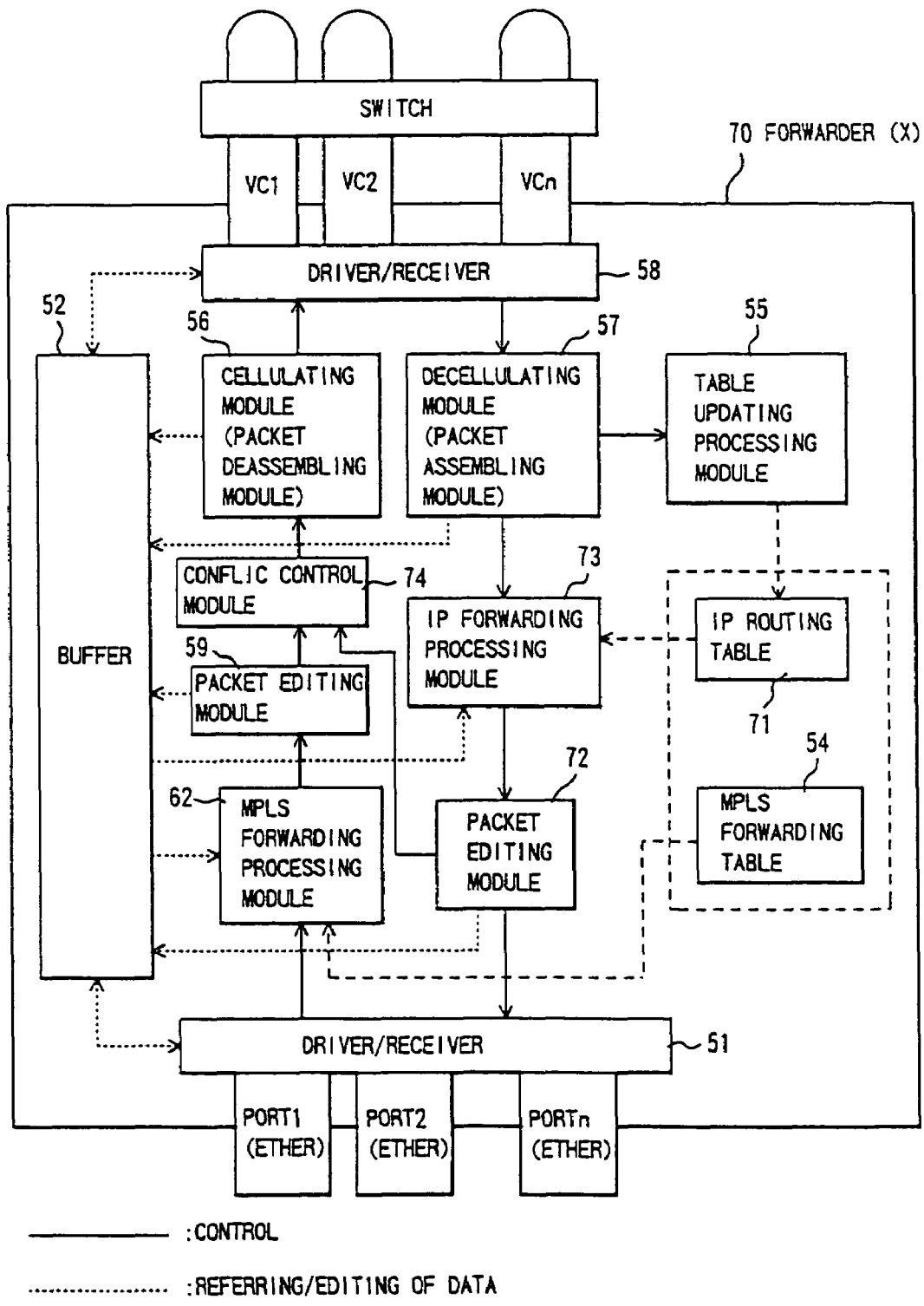
FIG. 24 is a block diagram showing a detailed architecture of a forwarder (X) in the LSR in the third embodiment.

FIG. 24 shows a first example of architecture of the IP/MPLS forwarder (X) in the LSR 40 illustrated in FIG. 22. An IP/MPLS forwarder (X) 70 actualizes the setting of the explicit LSP neither by changing the basic framework (in terms of mounting) of the system architecture shown in FIG. 2 nor by the ingress node specifying (managing) the adapters of the egress node.

Functions of this IP/MPLS forwarder (X) 70, which are to be added to the architecture of the IP/MPLS forwarder 50 shown in FIG. 23, will be explained. An IP routing table 71 is a copy of a part of the IP routing table possessed by the LSR body, and contains ports 1~n as output destination ports and VCs 1~n. A packet editing module 72 executes a process of editing the IP header and the MPLS header. Responding to indications given from the IP forwarding processing module 73, there are, however, a case where the packet editing module 72 indicates the driver 51 to transmit the edited packets to the port n, and a case where the packet editing module 72 indicates a conflict control module 74 to transmit the edited packets to the virtual channel (VC) n.

An IP forwarding processing module 73 determines a packet transmitting destination with reference to the IP routing table 71, and indicates the packet editing module 72 to edit the IP header. On this occasion, the IP forwarding processing module 72 explicates whether the transmitting destination is the port nor the VC n. The conflict control module 74 controls a conflict between shuttle packets inputted from the port n and from the VC n, and executes scheduling of the input packets to the cellulating module 56.

(Second Example of Architecture of IP/MPLS Forwarder (X))

Figure 25:
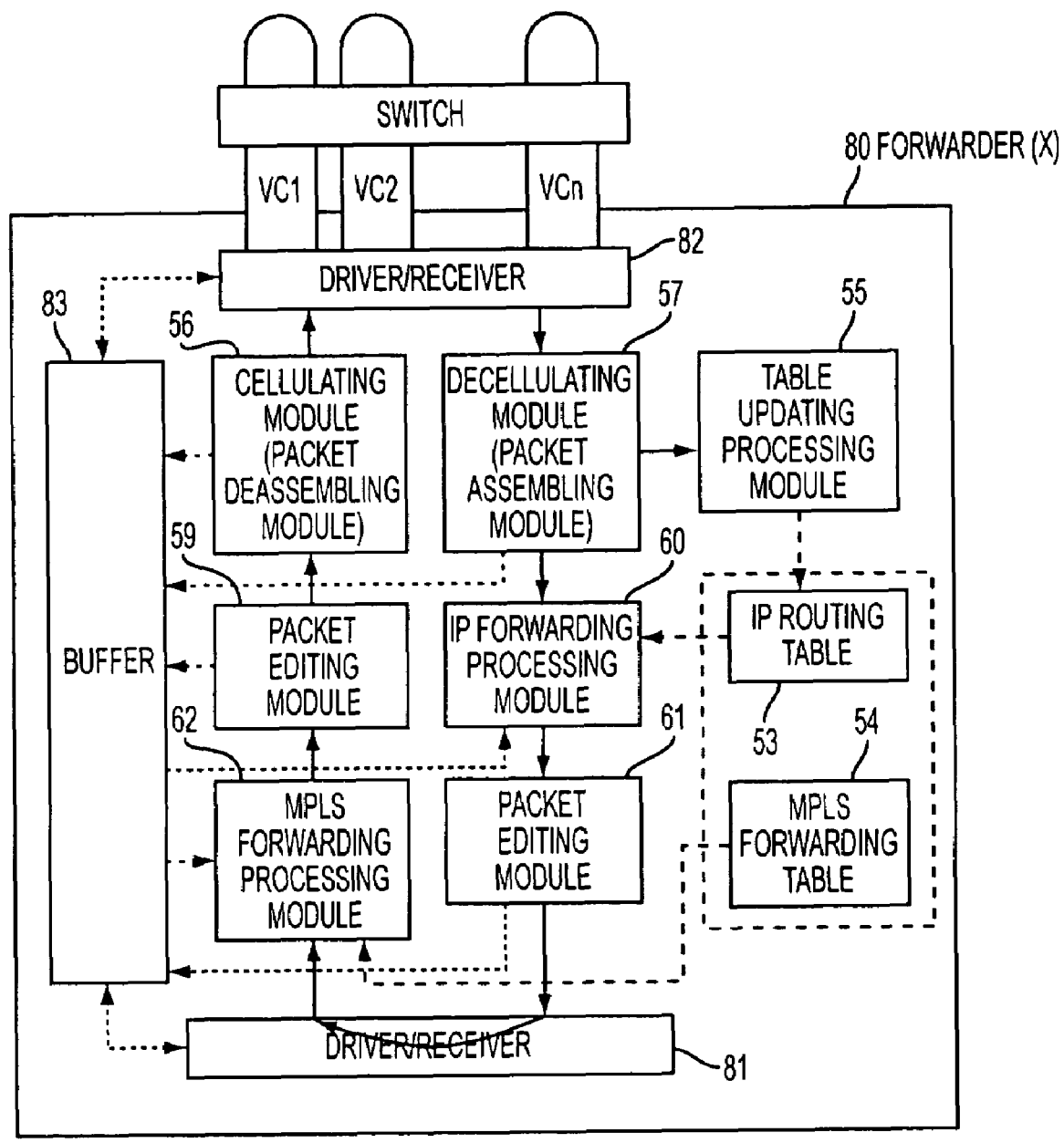
FIG. 25 is a block diagram showing a detailed architecture of the forwarder (X) in the LSR in the third embodiment.

FIG. 25 shows a second example of architecture of the IP/MPLS forwarder (X) in the LSR 40 illustrated in FIG. 22. Functions of this IP/MPLS forwarder (X) 80, which are to be added to the architecture of the IP/MPLS forwarder 50 shown in FIG. 23, will be explained.

Drivers/receivers 81, 82 transmit and receive the data to and from the outside interface (ATM/Ether). The received data are stored in a buffer 83. The drivers/receivers 81, 82 transfer the control, wherein addresses and sizes of the received data are set as output data. When in the data transmitting process, the drivers/receivers 81, 82 transmit the data stored in the buffer 83, wherein the addresses and the sizes thereof are set as input data. In this architecture, however, the drivers/receivers 81, 82 are operated only for data shuttling, and do not therefore receive the data from outside.

Although only a few embodiments of the present invention have been described in detail above, those skilled in the art will readily appreciate that many modifications are possible in the preferred embodiments without departing from the novel teachings and advantages of the present invention. Accordingly, all such modifications are intended to be included within the scope of the present invention as defined by the following claims.

What is claimed is:

1. An explicit routing method in a label switching system, including explicitly specifying, when setting a label switched path (LSP) on the basis of an explicit route specified, a port or a port group of an egress node, and a port or a port group of a relay node, the explicit routing method comprising:
- a step of specifying a port or a port group of the egress node by setting an IP address corresponding to the port or the port group of the egress node in a final ER-HOP-TLV field in ER-TLVs in Label Request Message of CR-LDP (Constraint-Based LSP setup using LDP (Label Distribution Protocol)); and
- a step of specifying a port or a port group of the relay node by setting an IP address corresponding to the port or the port group of the relay node in an intermediate ER-HOP-TLV field in ER-TLVs in Label Request Message of the CR-LDP.

2. An explicit routing method in a label switching system, including explicitly specifying, when setting a label switched path (LSP) on the basis of an explicit route specified, a port or a port group of an egress node, and a port or a port group of a relay node, the explicit routing method comprising:
- a step of specifying the port or the port group of the egress node and the port or the port group of the relay node by adding an intra-system port number or an intra-system port group number in an ER-HOP-TLV field in ER-TLVs in Label Request Message of CR-LDP (Constraint-Based LSP setup using LDP (Label Distribution Protocol)).

3. An explicit routing method in a label switching system, including explicitly specifying, when setting a label switched path (LSP) on the basis of an explicit route specified, a part or a port group of an egress node, and a port or a port group of a relay node, the explicit routing method comprising:
- a step of explicating a port through which data should pass per system and specifying a port or a port group of the egress node by use of a resource class TLV field with ER-TLV in Label Request Message of CR-LDP (Constraint-Based LSP setup using LDP (Label Distribution Protocol)) being used as ER-HOP-TLV.

4. An explicit routing method in a label switching system, including explicitly specifying, when setting a label switched path (LSP) on the basis of an explicit route specified, a port or a port group of an egress node, and a port or a port group of a relay node, the explicit routing method comprising:
- a step of specifying a port or a port group of the ogress node by setting an IP address corresponding to the port or the port group of the egress node in a final Subject-object field in Explicit Route Objects in a path message of RSVP protocol (Resource reSerVation Protocol) extended for setting a label switched path in MPLS protocol (Multi Protocol Label Switching); and
- a step of specifying a port or port group of the relay node by setting an IP address corresponding to the port or the port group of the relay node in an intermediate Subject-object field in Explicit Route Objects in the path message of the RSVP protocol.

5. An explicit routing method in a label switching system, including explicitly specifying, when setting a label switched path (LSP) on the basis of an explicit route specified, a port or a port group of an egress node, and a port or a port group of a relay node, the explicit routing method comprising:
- a step of specifying a port or a port group of the egress node and a port or a port group of the relay node by adding an intra-system port number or an intra-system port group number in a Subject-object field in Explicit Route Objects in the path message of RSVP protocol (Resource reSerVation Protocol) extended for setting the label switched path in MPLS protocol (Multi Protocol Label Switching).

6. An explicit routing method in a label switching system, comprising:
- a step of specifying an MPLS (Multi Protocol Label Switching) explicit route by adding, to an MPLS-to-IP forwarding function of a port group in one specified egress node, a communication function with an MPLS-to-IP forwarding function of a port group in an intra-system other egress node, and a forwarding function to the port group in the intra-system other egress node; and
- wherein the one specified egress node and the intra-system other egress node are in a label switching router connected to an MPLS network and a non-MPLS network.

7. A packet router in a label switching system, including explicitly specifying, when setting a label switched path (LSP) on the basis of an explicit route specified, a port or a port group or an egress node, and a port or a port group of a relay node, the packet router comprising:
- a module for specifying a port or a port group of the egress node by setting an IP address corresponding to the port or the port group of the egress node in a final ER-HOP-TLV field in ER-TLVs in Label Request Message of CR-LDP (Constraint-Based LSP setup using LDP (Label Distribution Protocol)); and
- a module for specifying a port or a port group of the relay node by setting an IP address corresponding to the port or the port group of the relay node in an intermediate ER-HOP-TLV field in ER-TLVs in Label Request Message of the CR-LOP.

8. A packet router in a label switching system, including explicitly specifying, when setting a label switched path (LSP) on the basis of an explicit route specified, a port or a port group of an egress node, and a port or a port group of a relay node, the packet router comprising:
- a module for specifying the port or the port group of the egress node and the port or the port group of the relay node by adding an intra-system port number or an intra-system port group number in a ER-HOP-TLV field in ER-TLVs in Label Request Message of CR-LDP (Constraint-Based LSP setup using LDP (Label Distribution Protocol)).

9. A packet router in a label switching system, including explicitly specifying, when setting a label switched path (LSP) on the basis of an explicit route specified, a port or a port group of an egress node, and a port or a port group of a relay node, the packet router comprising:
- a module for explicating a port through which data should pass per system and specifying a port or a port group of the egress node by use of a resource class TLV field with ER-TLV in Label Request Message of CR-LDP (Constraint-Based LSP setup using LDP (Label Distribution Protocol)) being used as ER-HOP-TLV.

10. A packet router in a label switching system, including explicitly specifying, when setting a label switched path (LSP) on the basis of an explicit route specified, a port or a port group of an egress node, and a port or a port group of a relay node, the packet router comprising:
- a module for specifying a port or a port group of the egress node by setting an IP address corresponding to the port or the port group of the egress node in a final Subject-object field in Explicit Route Objects in a path message of RSVP protocol Resource reSerVation Protocol) extended for setting a label switched path in MPLS protocol (Multi Protocol Label Switching); and a module for specifying a port or port group of the relay node by setting an IP address corresponding to the port or the port group of the relay node in an intermediate Subject-object field in Explicit Route Objects in the path message of the RSVP protocol.

11. A packet router in a label switching system, including explicitly specifying, when setting a label switched path (LSP) on the basis of an explicit route specified, a port or a port group of an egress node, and a port or a port group of a relay node, the packet router comprising:

a module for specifying a port or a port group of the egress node and a port or a port group of the relay node by adding an intra-system port number or an intra-system port group number in an Subject-object field in Explicit Route Objects in the path message of RSVP protocol (Resource reSerVation Protocol) extended for setting the label switched path in MPLS protocol.

12. A packet router in a label switching system, comprising:

a module for specifying an MPLS (Multi Protocol Label Switching) explicit route by adding, to an MPLS-to-IP forwarding function of a port group in one specified egress node, a communication function with an MPLS-to-IP forwarding function of a port group in an intra-system other egress node, and a forwarding function to the port group in the intra-system other egress node; and wherein the one specified egress node and the intra-system other egress node are in a label switching router connected to an MPLS network and a non-MPLS network.

\* \* \* \* \*

UNITED STATES PATENT AND TRADEMARK OFFICE
CERTIFICATE OF CORRECTION

PATENT NO. : 7,336,648 B1
APPLICATION NO. : 09/696674
DATED : February 26, 2008
INVENTOR(S) : Yasushi Sasagawa It is certified that error appears in the above-identified patent and that said Letters Patent is hereby corrected as shown below:

Column 15, line 32 claim 3: "a part or" should be changed to --a port or--; line 47, "the ogress" should be changed to --the egress--.

Column 16, line 23 claim 7: "group or an" should be changed to --group of an--; line 35, "of the CR-LOP." should be changed to --of the CR-LDP.--.

Column 17, line 1 claim 10: "RSVP protocol Resource" should be changed to --RSVP protocol (Resource--.

Signed and Sealed this

Twenty-eighth Day of April, 2009

JOHN DOLL
*Acting Director of the United States Patent and Trademark Office*